US008823994B2

(12) United States Patent
Shimatani

(10) Patent No.: US 8,823,994 B2
(45) Date of Patent: Sep. 2, 2014

(54) IMAGE READING DEVICE AND IMAGE FORMING APPARATUS WITH THE SAME

(71) Applicant: KYOCERA Document Solutions Inc., Osaka (JP)

(72) Inventor: Akira Shimatani, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 28 days.

(21) Appl. No.: 13/755,924

(22) Filed: Jan. 31, 2013

(65) Prior Publication Data

US 2013/0222828 A1 Aug. 29, 2013

(30) Foreign Application Priority Data

Feb. 24, 2012 (JP) .................................. 2012-038801

(51) Int. Cl.
G06F 15/00 (2006.01)
(52) U.S. Cl.
USPC ............................ 358/1.16; 358/475; 358/474
(58) Field of Classification Search
None
See application file for complete search history.

(56) References Cited

U.S. PATENT DOCUMENTS

| 2010/0141999 A1* | 6/2010 | Akahane | 358/1.16 |
| 2011/0235136 A1* | 9/2011 | Endoh | 358/475 |
| 2011/0286051 A1* | 11/2011 | Yamakita | 358/474 |
| 2012/0170083 A1* | 7/2012 | Joh | 358/475 |

FOREIGN PATENT DOCUMENTS

JP 09-233266 A 9/1997

* cited by examiner

*Primary Examiner* — Firmin Backer
*Assistant Examiner* — Helen Q Zong
(74) *Attorney, Agent, or Firm* — Knobbe, Martens, Olson & Bear LLP

(57) ABSTRACT

An image reading device includes a light source, an image sensor, a transport unit, and a control unit. While, during reading of a target to be read by the image sensor, the control unit causes the transport unit to accelerate the read rate of the image sensor to a reference read rate or to decelerate the read rate thereof from the reference read rate, the control unit causes the light source to light up, within the read time, with timing brought close to a read section from a lighting start point to a lighting end point in the case of reading one line in the reference read time.

9 Claims, 12 Drawing Sheets

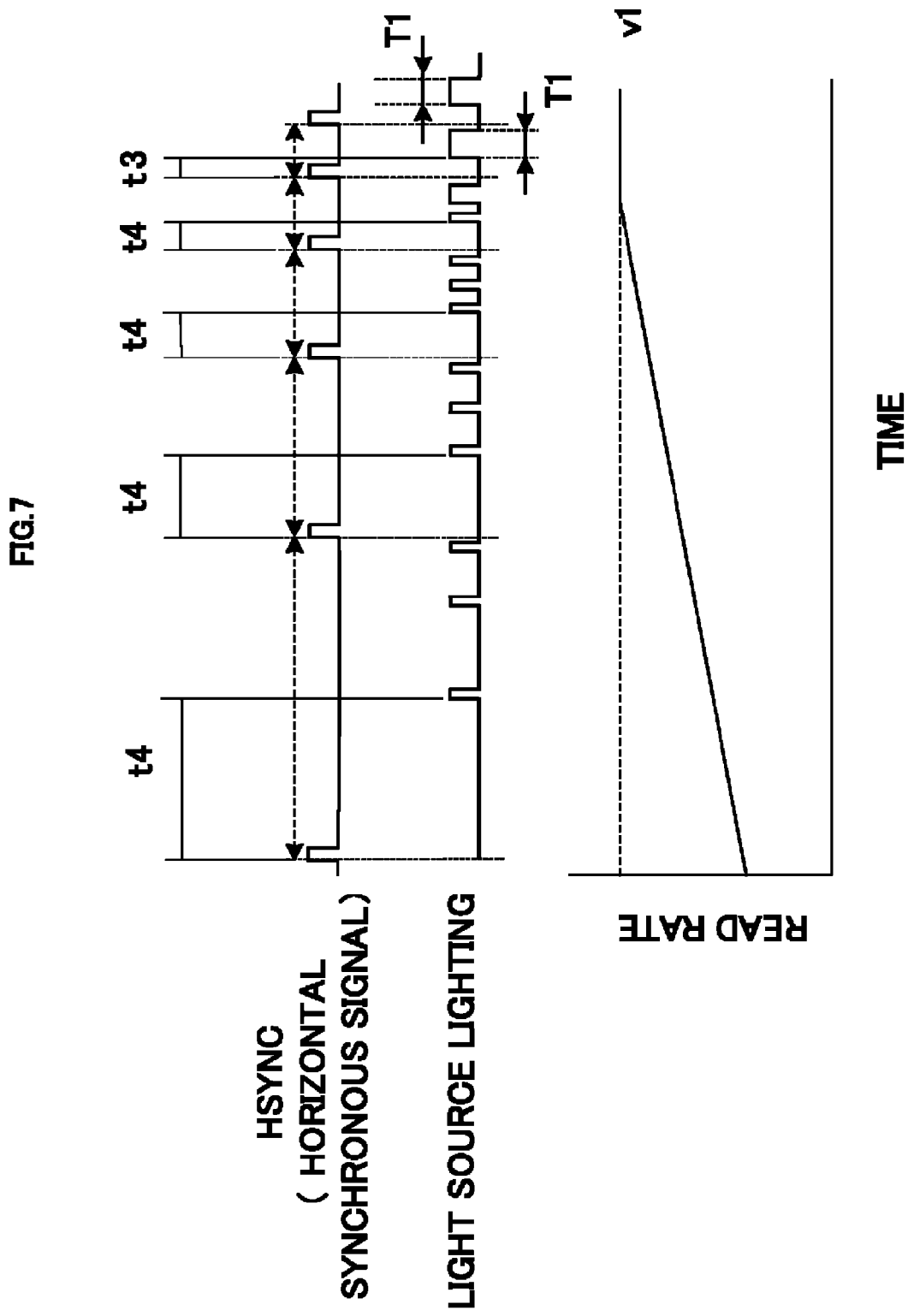

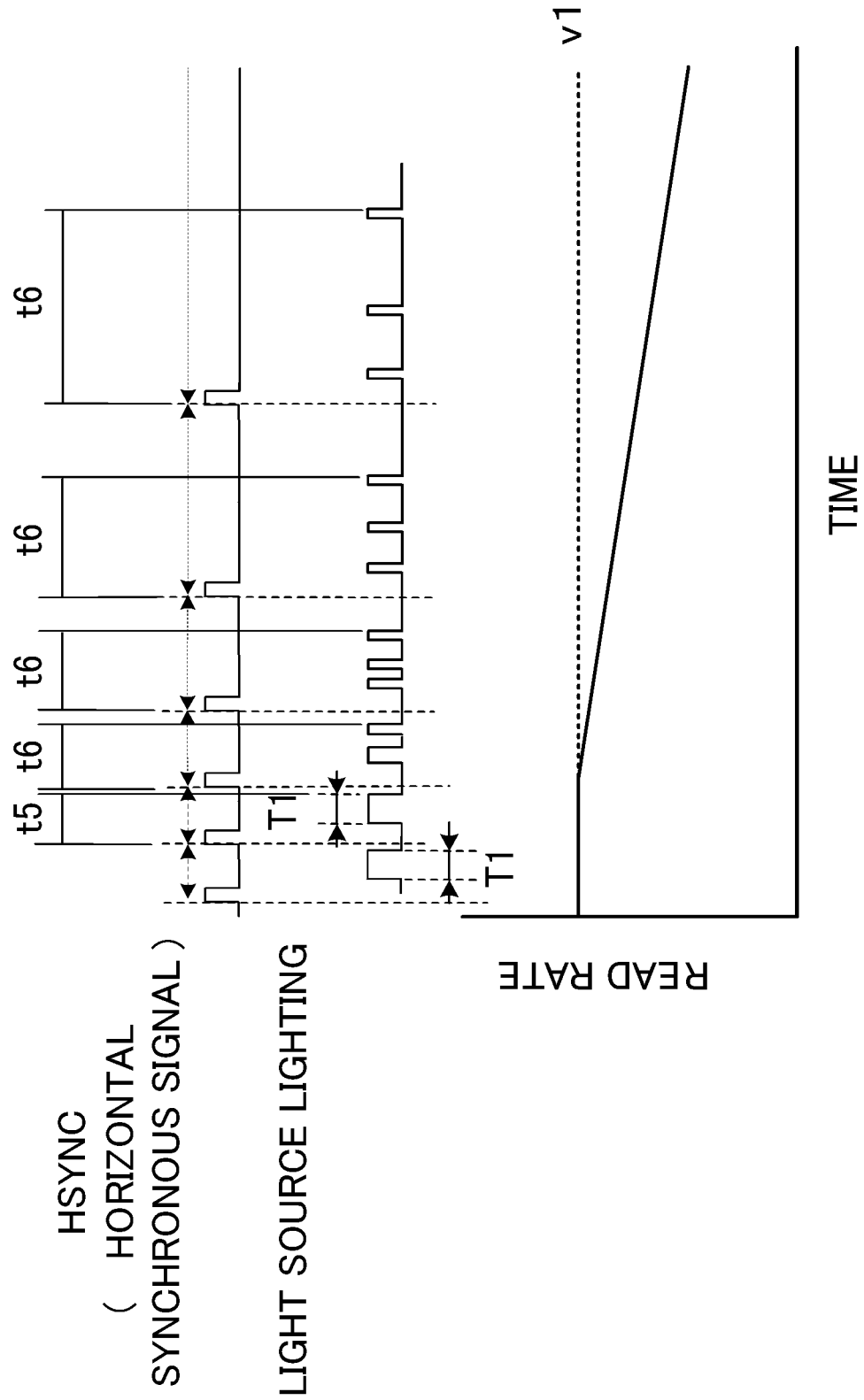

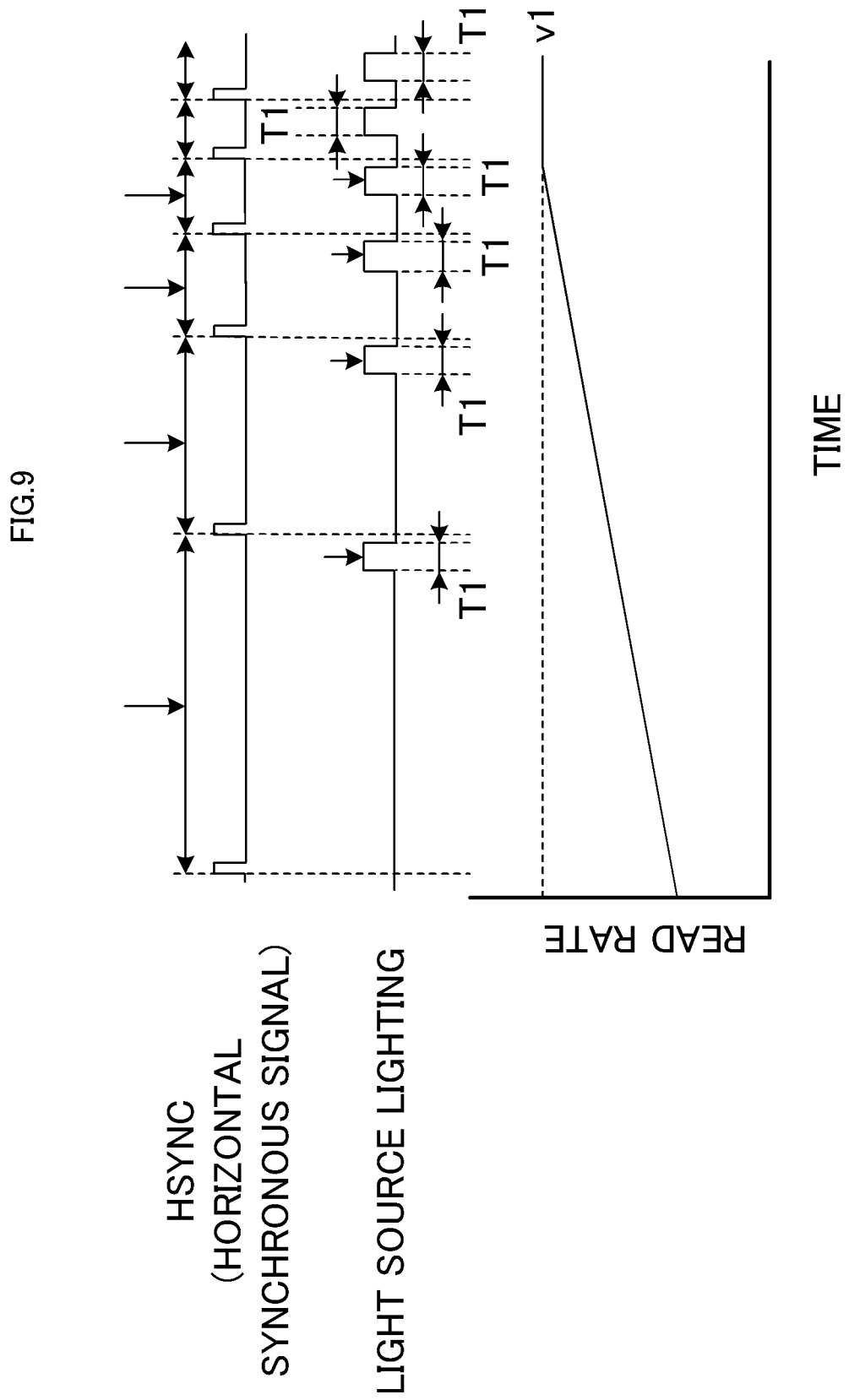

IMAGE READING DEVICE AND IMAGE FORMING APPARATUS WITH THE SAME

INCORPORATION BY REFERENCE

This application claims priority to Japanese Patent Application No. 2012-38801 filed on Feb. 24, 2012, the entire contents of which are incorporated by reference herein.

BACKGROUND

The present disclosure relates to an image reading device operable to read an original document and create image data from the read original document. The present disclosure also relates to an image forming apparatus with the image reading device.

Image reading devices generally include a light source and an image sensor. The light source irradiates a target to be read (an original document) with light. The reflected light from the target to be read is guided to the image sensor. The image reading device acquires image data based on an output of the image sensor. For example, a line sensor is provided as the image sensor in the image reading device. The read time (scan time) per line for which the image sensor reads one line of the target to be read is normally fixed. However, during reading of a sheet of original document, the read time per line may be changed to change the read rate. In this case, it is necessary to control, depending on the read rate, the amount of light applied to the original document within the read time per line. If not controlled, the amount of light received during reading of one line will vary from line to line even when the original document having a uniform concentration is read. Thus, the image data element read from each line will vary in concentration (pixel value) depending on the read rate, resulting in failure to correctly read the original document.

A description will be given of an example of an image reading device in relation to changes in read rate during reading of an identical original document. An image reading device can change the read rate by changing each of the scan time per line of a line sensor and the original conveyance rate of an original conveyance mechanism and controls, according to the scan time per line, the luminescence intensity of a light source for irradiating the original document with light. This image reading device compensates for variations in amount of light received by the line sensor due to changes in scan time per line, such as for the purpose of changing the read rate, with the control on the luminescence intensity of the light source.

Image reading devices, during reading of a sheet of original document, may increase and decrease the read time per line to change the read rate. For example, when an original document placed on an contact glass plate is read by moving a light source, a mirror for guiding reflected light to an image sensor, and so on, a certain time and a certain movement distance are necessary to increase the movement rate to a reference rate even if the light source and so on are moved at a constant rate. Furthermore, in order to increase the rate of acceleration of movement of the light source and so on, a motor having a large torque, for example, is necessary. Such a high-power motor meeting a desired capability is large and expensive and the mounting thereof on the image reading device is unrealistic. Instead of this, the rate of movement of the light source and so on is gradually accelerated to a reference read rate and, upon achievement of the reference rate, the light source is allowed to illuminate at a predetermined amount of light. Thus, image data obtained by reading of a sheet of original document is avoided from showing concentration differences (degradation of image quality) due to changes in read rate, so that reading can be performed even using a low-torque motor.

If the processing of image data obtained by reading an original document is delayed, a buffer built in the image reading device to temporarily store image data will overflow unless the rate of creation of image data is decreased. Therefore, in order to obviate the occurrence of overflow in the buffer, the read rate may be intentionally decreased. When the image data output (transfer) rate is recovered, the read rate may be increased back to the reference read rate.

As just described, there also exists such an image reading device which can read an image of an original document to be read by irradiating the original document with light from a light source while increasing and decreasing the read rate.

SUMMARY

An image reading device according to one aspect of the present disclosure includes a light source, an image sensor, a transport unit, and a control unit.

The light source is configured to irradiate a target to be read with light.

The image sensor includes a plurality of photoelectric conversion elements and is configured to read, based on reflected light from the target to be read, the target to be read for each line having a predetermined width in a sub scanning direction.

The transport unit is configured to move the light source or the target to be read in the sub scanning direction.

The control unit, during the reading of the target to be read by the image sensor, causes the light source to light up at a predetermined amount of light for a predetermined fixed lighting time and causes the transport unit to move to change a read time per line and a read rate of the image sensor.

Furthermore, while, during the reading of the target to be read by the image sensor, the control unit causes the transport unit to accelerate the read rate to a reference read rate which is the read rate at which the read time per line is a predetermined reference read time or to decelerate the read rate from the reference read rate, the control unit causes the light source to light up, within the read time, with timing brought close to a read section from a lighting start point to a lighting end point in the case of reading the one line in the reference read time.

An image forming apparatus according to one aspect of the present disclosure includes a light source, an image sensor, a transport unit, a control unit, and an image forming unit.

The light source is configured to irradiate a target to be read with light.

The image sensor includes a plurality of photoelectric conversion elements and is configured to read, based on reflected light from the target to be read, the target to be read for each line having a predetermined width in a sub scanning direction.

The transport unit is configured to move the light source or the target to be read in the sub scanning direction.

The control unit, during the reading of the target to be read by the image sensor, causes the light source to light up at a predetermined amount of light for a predetermined fixed lighting time and causes the transport unit to move to change a read time per line and a read rate of the image sensor.

The image forming unit is configured to form an image using read data read by the image sensor.

Furthermore, while, during the reading of the target to be read by the image sensor, the control unit causes the transport unit to accelerate the read rate to a reference read rate which is the read rate at which the read time per line is a predetermined reference read time or to decelerate the read rate from the reference read rate, the control unit causes the light source to light up, within the read time, with timing brought close to a read section from a lighting start point to a lighting end point in the case of reading the one line in the reference read time.

BRIEF DESCRIPTION OF THE DRAWINGS

FIG. 7 is a graph illustrating an example of lighting during acceleration of the read rate in an image reading device according to a first embodiment.

FIG. 8 is a graph illustrating an example of lighting during deceleration of the read rate in the image reading device according to the first embodiment.

FIG. 9 is a graph illustrating an example of lighting during acceleration of the read rate in an image reading device according to a second embodiment.

DETAILED DESCRIPTION

Hereinafter, a first embodiment according to one aspect of the present disclosure will be described with reference to FIGS. 1 to 8. A second embodiment will also be described with reference to FIGS. 9 to 12. The following description is given taking as an example a multifunction peripheral 200 (corresponding to an image forming apparatus) including an image reading device 100. However, elements of a structure, an arrangement and the like described in each embodiment are not intended to limit the scope of the present disclosure but are merely illustrative examples.
(General Structure of Multifunction Peripheral 200)

Figure 1:
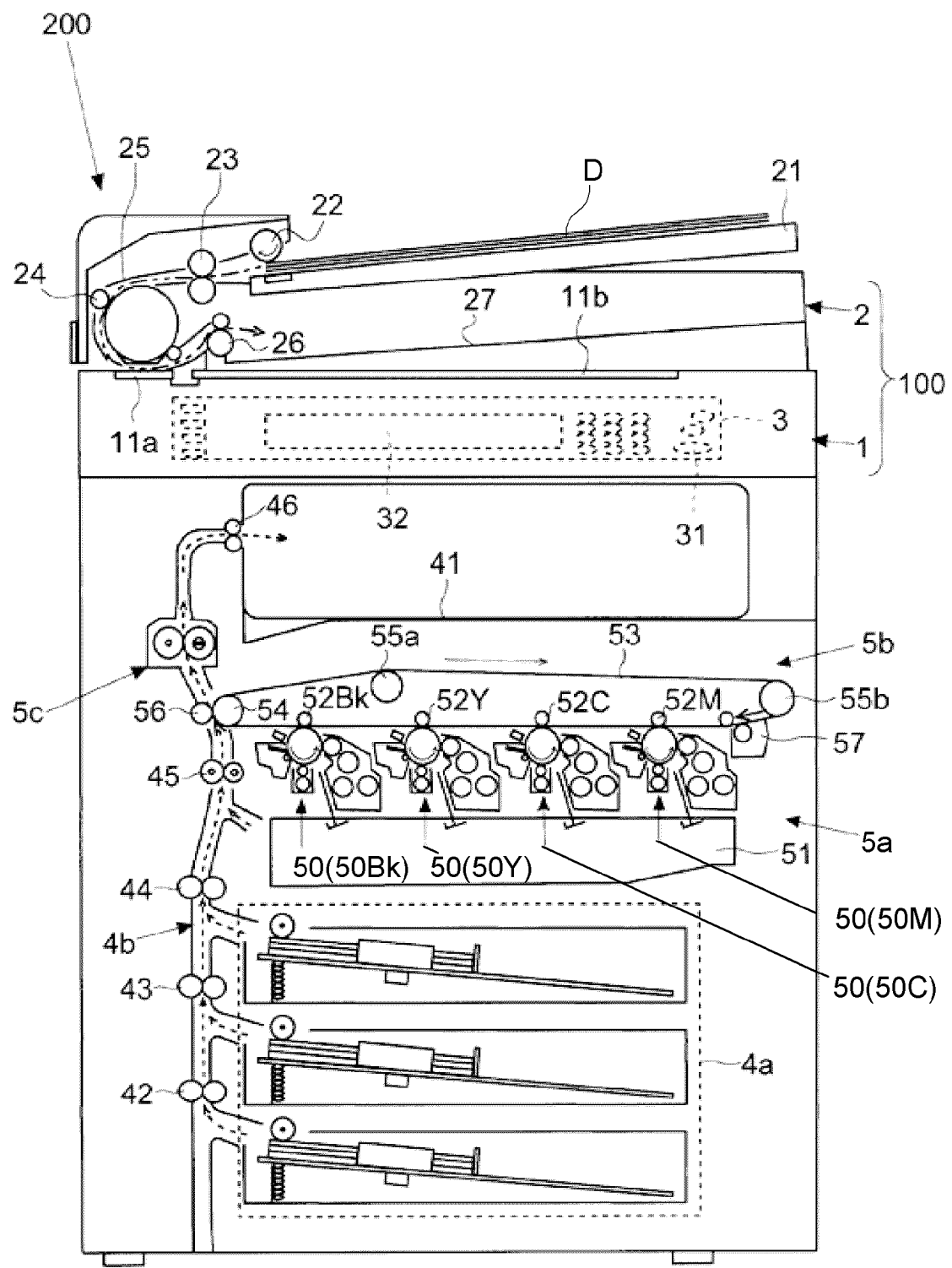
FIG. 1 is a schematic front cross-sectional view of a multifunction peripheral.

First, an overview of a multifunction peripheral 200 according to a first embodiment is explained with reference to FIG. 1. FIG. 1 is a schematic front cross-sectional view of the multifunction peripheral 200.

As shown in FIG. 1, an image reading device 100 is disposed at the top of the multifunction peripheral 200, wherein the image reading device 100 includes: an image reading unit 1 (which will be described later in detail) operable to read an image of an original document D; and an original conveyance unit 2 (which corresponds to the transport unit and will be described later in detail). The multifunction peripheral 200 is also provided at a front portion with a control panel 3 (shown by the broken lines in FIG. 1). The control panel 3 includes: a start key 31 for giving an instruction to start the operations of the image reading device 100 and the multifunction peripheral 200; and a display 32 (for example, a liquid crystal panel). The display 32 can display the state of the multifunction peripheral 200, a menu for selecting functions, keys for entering setup values, etc. The display 32 is formed of a touch panel (or includes a touch panel).

A paper feed unit 4a, a paper conveyance unit 4b, an image forming unit 5a (which will be described later in detail), an intermediate transfer unit 5b, and a fixing unit 5c are arranged in the multifunction peripheral 200.

The paper feed unit 4a contains paper as a recording medium, such as paper sheets (of different sizes including A4 and B4), and feeds paper in forming an image. The paper conveyance unit 4b conveys the fed paper to a paper output tray 41. To this end, the paper conveyance unit 4b is provided with a plurality of roller pairs, including conveyance roller pairs 42, 43, 44, a resist roller pair 45, and an output roller pair 46.

The image forming unit 5a includes a plurality of image forming subunits 50 (50Bk for black, 50Y for yellow, 50C for cyan, and 50M for magenta) and an exposure device 51. The exposure device 51, based on image data or the like read in the image reading unit 1, emits laser light while turning the light on and off to scan and expose each of photosensitive drums of the image forming subunits 50. Each image forming subunit 50 includes the photosensitive drum supported to be driven into rotation and further includes a charging device, a developing device, and a cleaning device which are arranged around the photosensitive drum. In this arrangement, each image forming subunit 50 and the exposure device 51 enable a toner image to be formed on the peripheral surface of the associated photosensitive drum.

The intermediate transfer unit 5b is provided above the image forming unit 5a. The intermediate transfer unit 5b undergoes a primary transfer of toner images formed in the image forming subunits 50 of the image forming unit 5a based on image data and performs a secondary transfer of the toner images to the fed paper. An intermediate transfer belt 53 is mounted around a drive roller 54, driven rollers 55a, 55b, four primary transfer rollers 52Bk, 52Y, 52C, 52M, and so on. The drive roller 54 is connected to a drive mechanism (not shown), such as a motor or a gear, to allow itself to rotate. The intermediate transfer belt 53 runs to make a loop in the clockwise direction (direction of the arrow) in FIG. 1 by following the rotation of the drive roller 54. The primary transfer rollers 52Bk, 52Y, 52C, 52M are individually rotatably arranged, each opposite to one of the image forming subunits 50. By applying a predetermined level of voltage to each of the primary transfer rollers 52Bk, 52Y, 52C, 52M, each colored toner image is primarily transferred from the associated image forming subunit 50 to the intermediate transfer belt 53. In this primary transfer, all the colored toner images are superimposed on each other without misalignment.

The intermediate transfer unit 5b is further provided with a secondary transfer roller 56 which engages against the intermediate transfer belt 53, is opposed to the drive roller 54, and is rotatably supported. When the paper and the multi-colored toner image enter a nip between the drive roller 54 and the intermediate transfer belt 53, a predetermined voltage is applied to the secondary transfer roller 56 so that the toner image is secondarily transferred to the paper. A belt cleaning device 57 cleans residual toner from the intermediate transfer belt 53. The fixing unit 5c fixes the toner image transferred to the paper. The paper is pressed and heated during passage through the fixing unit 5c, so that the toner image is fixed on the paper. Thereafter, the paper is ejected to the paper output tray 41, resulting in completion of image formation.

(Overview of Image Reading Device 100)

Figure 2:
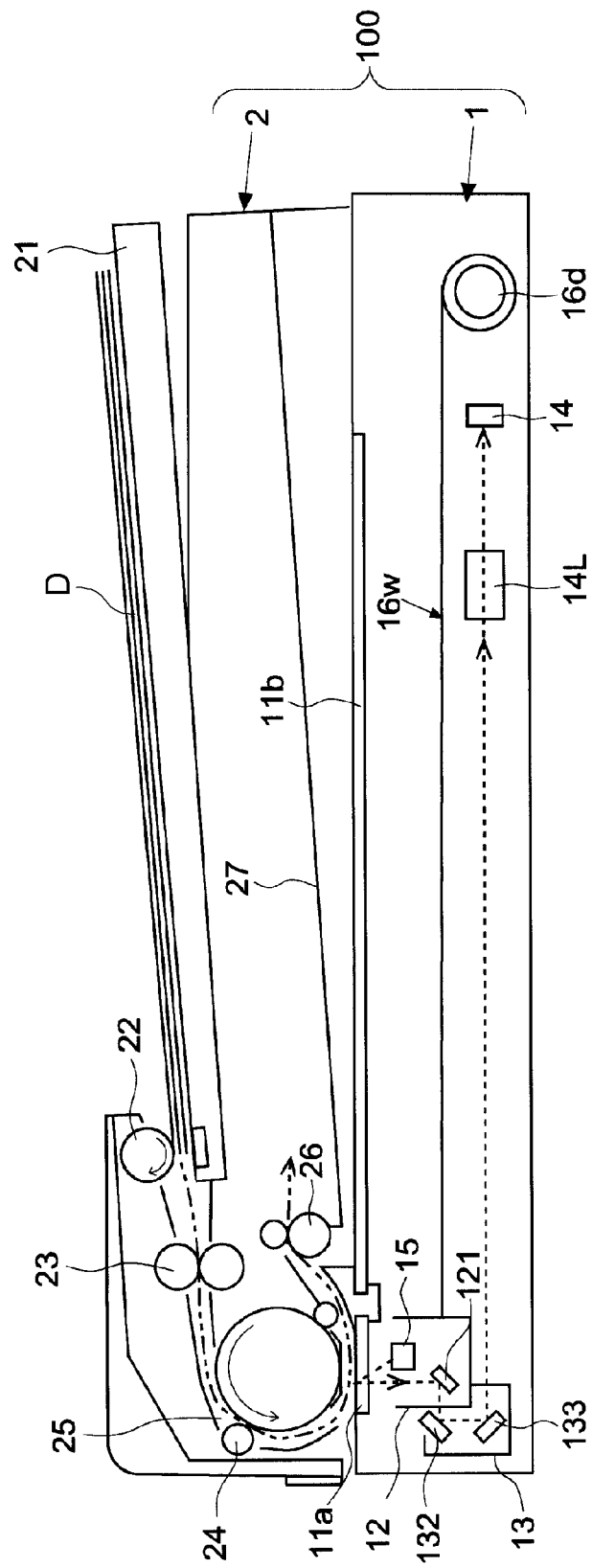
FIG. 2 is a schematic front cross-sectional view showing an example of an image reading device.

Next, the image reading device 100 according to the first embodiment is described with reference to FIG. 2. FIG. 2 is a schematic front cross-sectional view showing an example of the image reading device 100.

The image reading device 100 of this embodiment includes an image reading unit 1 and an original conveyance unit 2 (corresponding to the transport unit) provided on top of the image reading unit 1.

The original conveyance unit 2 includes an original tray 21 on which original documents D to be read are to be placed, a plurality of original conveyance roller pairs 22, 23, 24 for conveying an original document D, an original conveyance path 25, an original ejection roller pair 26, and an original ejection tray 27. The original documents D on the original tray 21 are fed sheet by sheet to the original conveyance path 25. The fed original documents D are automatically and continuously conveyed to come into contact with a contact glass 11a for reading a moving original document. The contact glass 11a is located at the top surface of the image reading unit 1. Then, the original ejection roller pair 26 ejects the read original document D to the original ejection tray 27. Alternatively, the original conveyance unit 2 can be lifted up about a pivot point (not shown) provided at the back of the plane of FIG. 2. Thus, for example, an original document D, such as a book page, can be set on a contact glass 11b for reading a stationary original document. The contact glass 11b is located at the top surface of the image reading unit 1.

The image reading unit 1 irradiates the original document D with light and reads it based on the reflected light to create image data of the original document D. For reading the original document, the image reading unit 1 includes the above contact glass, a first movable frame 12, a second movable frame 13, a lens 14L, and an image sensor 14.

The first movable frame 12 extends in the main scanning direction and includes: a light source 15 configured to irradiate a target to be read with light; and a first mirror 121. For example, the light source 15 is an LED lamp 151 containing a plurality of LEDs. The light source 15 irradiates an original document D with light along the main scanning direction. The second movable frame 13 includes a second mirror 132 and a third mirror 133. The first to third mirrors 121, 132, 133 guide the light reflected from the target to be read (original document D) to the lens 14L. The lens 14L forms an image from the reflected light from the original document D and guides it to the image sensor 14.

For example, the image sensor 14 in this embodiment is of a CCD type. The image sensor 14 includes the same number of line sensors as a plurality of colors (not shown), each line sensor including photoelectric conversion elements (pixels) arranged in a row. For reading an original document D, each line sensor of the image sensor 14 receives light having been applied from the light source 15 to the original document D and then formed into an image by the lens 14L and performs photoelectric conversion as a function of the amount of reflected light (which will be described later in detail). The line sensor extends in the direction toward the back of the plane of FIG. 2, which is the main scanning direction.

The first movable frame 12 and the second movable frame 13 are connected through wires 16w (corresponding to the transport unit) to a wind-up drum 16d (corresponding to the transport unit). Although each of the movable frames (the first movable frame 12 and the second movable frame 13) are naturally connected to a plurality of wires 16w to allow it to move sideways in the image reading device 100, a single wire 16w is shown in FIG. 2 for the sake of convenience. The wind-up drum 16d is rotated by a wind-up motor 16 (corresponding to the transport unit, see FIG. 4) capable of forward and reverse motion. Thus, the movable frames can be freely moved in the direction of sub scanning of the line sensors (the direction orthogonal to the main scanning direction or sideways in the image reading unit 100 in FIG. 2).

When an original document D on the contact glass 11b is read by the image reading device 100, a reading control unit 10 drives the wind-up drums 16d into rotation to move the movable frames in the horizontal direction. Thus, the light source 15 irradiates all portions of the original document D lying on the contact glass 11b with light by moving in the sub scanning direction relative to the original document D, and the image sensor 14 including the line sensors reads the portions of the original document D irradiated with light by the light source 15 line by line, one at a time for the line sensors. In the image reading device 100 of this embodiment, as for the reading of the original document D set on the contact glass 11b, the wind-up motor 16, the wind-up drum 16d, and the wires 16w, all of which are operable to move the movable frames, correspond to the transport unit.

On the other hand, when an original document D is read using the original conveyance unit 2, the reading control unit 10 drives the wind-up drum 16d into rotation to make the movable frames stationary below the moving original reading original glass plate 11a. Therefore, the light source 15 is positioned below the contact glass 11a. In this state, an original conveyance control unit 20 causes the original conveyance unit 2 to convey the original document D to come into contact with the contact glass 11a. Thus, the original document D moves relative to the light source 15 in the sub scanning direction. During this conveyance of the original document D, the image sensor 14 sequentially reads the portions of the original document D irradiated with light by the light source 15 line after line, one at a time for the line sensors. As for the reading of the original document D being conveyed on the contact glass 11a, the original conveyance unit 2 corresponds to the transport unit.

(Hardware Configuration of Multifunction Peripheral 200)

Figure 3:
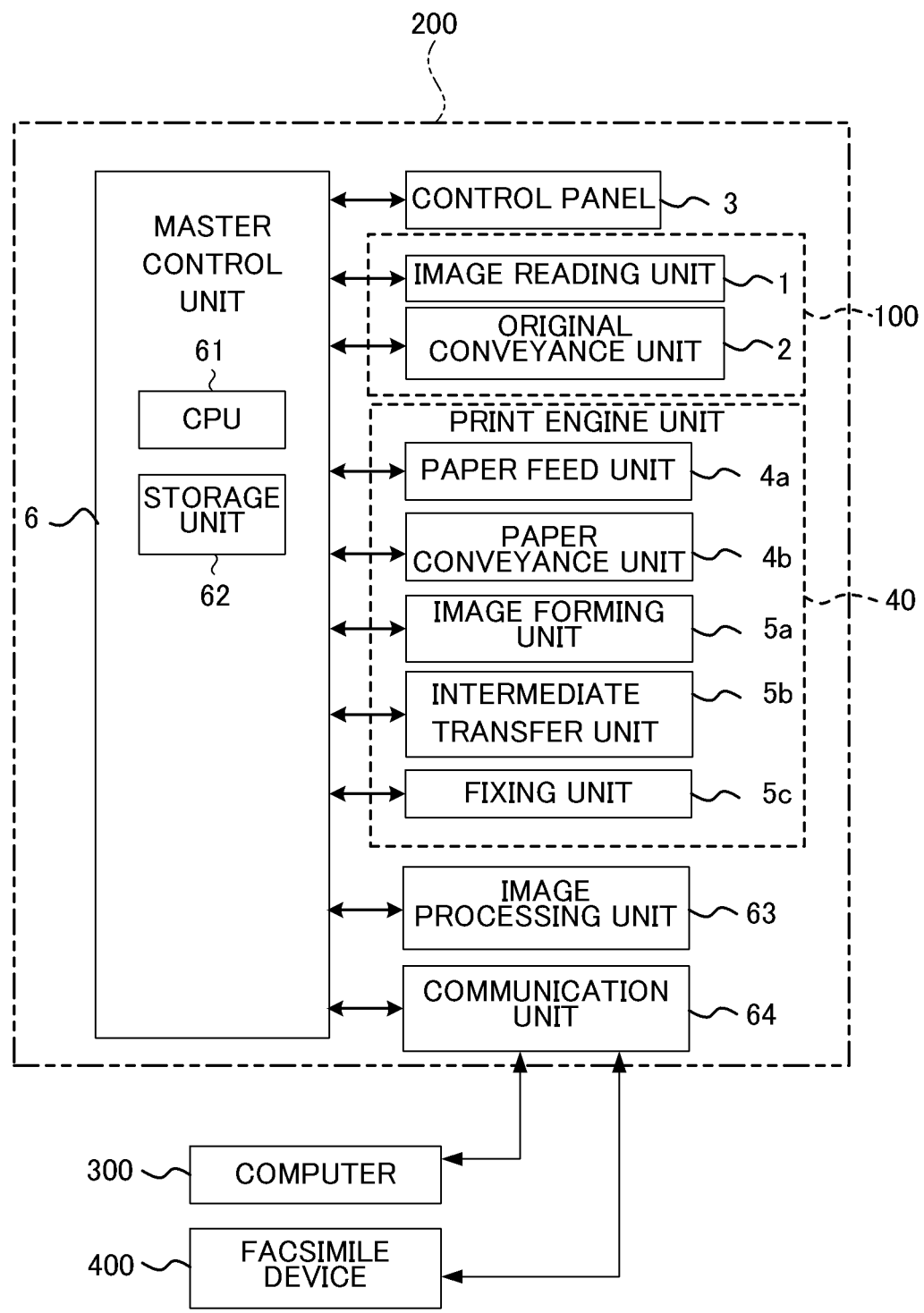
FIG. 3 is a block diagram showing an exemplary hardware configuration of the multifunction peripheral.

A hardware configuration of the multifunction peripheral 200 according to the first embodiment is next described with reference to FIG. 3. FIG. 3 is a block diagram showing an exemplary hardware configuration of the multifunction peripheral 200.

As shown in FIG. 3, the multifunction peripheral 200 according to this embodiment contains a master control unit 6. The master control unit 6 governs the overall control of the multifunction peripheral 200. For example, the master control unit 6 includes a CPU 61 and a storage unit 62. Furthermore, the master control unit 6 is connected to an image processing unit 63.

The CPU 61 is a central processing unit and performs the control on and arithmetic operation for components of the multifunction peripheral 200, based on a control program which is stored in the storage unit 62 and will be appropriately developed. The storage unit 62 is constituted by a storage device, such as a ROM, a RAM, an HDD or a flash ROM. The storage unit 62 stores a control program, control data, and setting data for the multifunction peripheral 200, image data scanned by the image reading unit 1, and so on.

The master control unit 6 is connected to the image reading device 100 (the original conveyance unit 2 and the image reading unit 1), a print engine unit 40 (print-related portions including the paper feed unit 4a, the paper conveyance unit 4b, the image forming unit 5a, the intermediate transfer unit 5b, and the fixing unit 5c) in the multifunction peripheral 200, and the control panel 3 and controls the operation of these components to enable appropriate image formation based on the control program and data in the storage unit 62. The master control unit 6 may be divided on a function basis into a plurality of control units, such as a main control unit for overall control and image processing and an engine control unit for the control of the print engine unit 40 (for example, ON/OFF control of motors for rotating various rotators).

The master control unit 6 is also connected to a communication unit 64 including various connectors, sockets, and communication control chips. The communication unit 64 connects the multifunction peripheral 200 for communication with a computer 300 (for example, a personal computer or a server) or a facsimile device 400 at the other end via a network, a cable, a public line or the like. For example, image data obtained by reading in the image reading device 100 can be transmitted to the external computer 300 or the external facsimile device 400 which may be an internet facsimile (a scanner function and a facsimile function). The facsimile device 400 may be an Internet facsimile device. Alternatively, image data from the external computer 300 or facsimile device 400 can be stored in the storage unit 62 and printed (a printer function and a facsimile function).

(Hardware Configuration of Image Reading Device 100)

Figure 4:
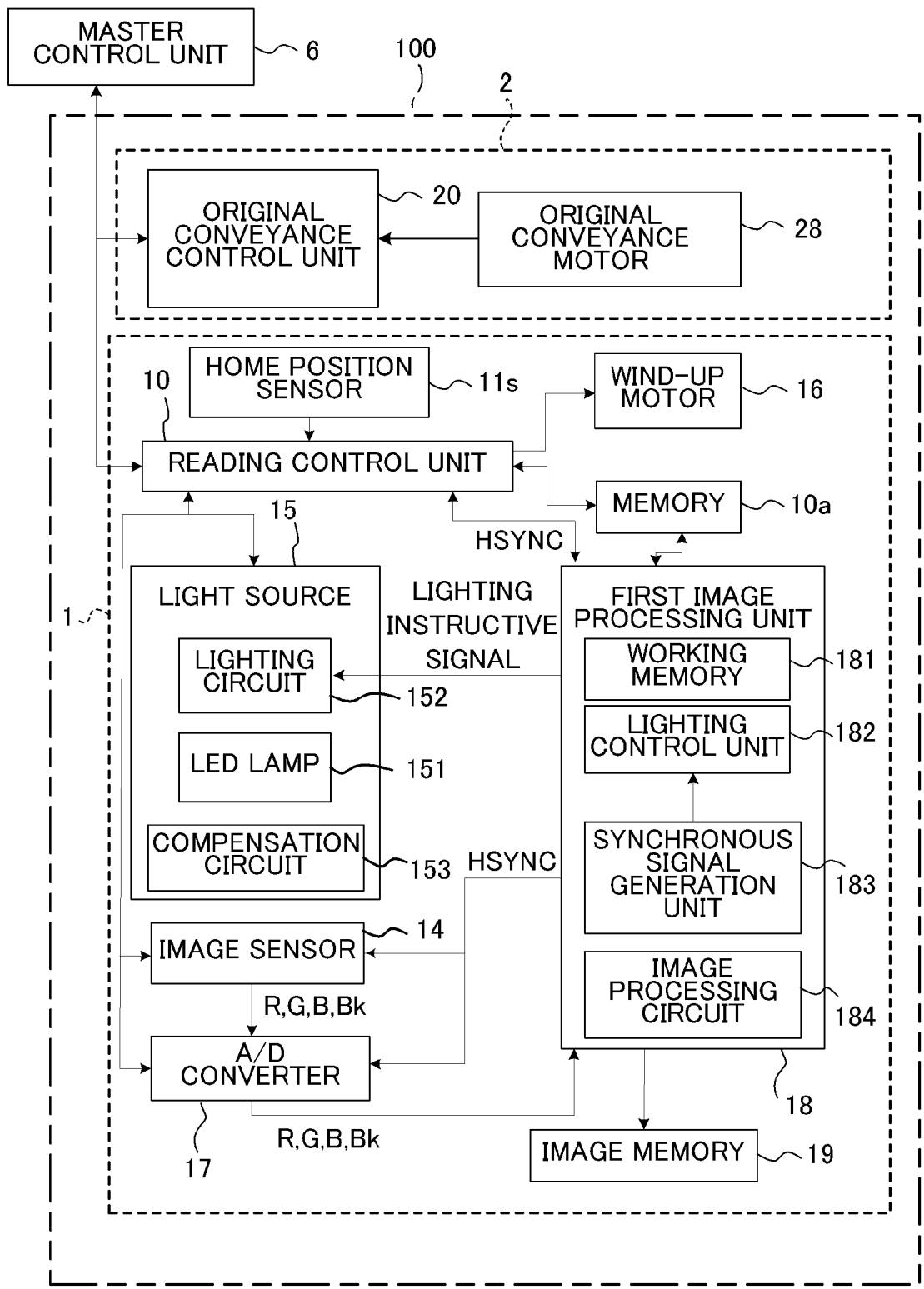
FIG. 4 is a block diagram showing an exemplary configuration of the image reading device.

An exemplary hardware configuration of the image reading device 100 according to the first embodiment is next described with reference to FIG. 4. FIG. 4 is a block diagram showing an exemplary configuration of the image reading device 100.

The image reading device 100 of this embodiment includes the original conveyance unit 2 and the image reading unit 1. The original conveyance unit 2 is provided with the original conveyance control unit 20 configured to control the operation of the original conveyance unit 2. On the other hand, the image reading unit 1 is provided with the reading control unit 10 configured to control the operation of the image reading unit 1.

The original conveyance control unit 20 is first explained. The original conveyance control unit 20 is connected to the above master control unit 6 and the reading control unit 10 and controls the operation of the original conveyance unit 2 in response to instructions and signals from the master control unit 6 and the reading control unit 10. The original conveyance control unit 20 is, for example, a board containing a CPU as a central processing unit and a ROM or RAM as a storage device storing a control program and control data. The original conveyance control unit 20 communicates with the master control unit 6 and the like or receives instructions from the master control unit 6 and the like to control the operation of the original conveyance unit 2. For example, when receiving from the master control unit 6 an instruction to read an original document D, the original conveyance control unit 20 drives an original conveyance motor 28 to rotate the original conveyance roller pairs 42, 43, 44.

Furthermore, the original conveyance control unit 20 can control the rotation rate of the original conveyance motor 28 to change the original conveyance (the rate of movement of the original document D) and thus change the read rate of the document D or the read time per line thereof in the sub scanning direction.

The image reading unit 1 is next explained. The reading control unit 10 provided in the image reading unit 1 is connected for communication with the master control unit 6 and the original conveyance control unit 20. The reading control unit 10 controls the operation of the image reading unit 1 in response to instructions and signals from the master control unit 6. For example, the reading control unit 10 is a board containing a CPU and a ROM or RAM as a storage device storing a program and data necessary for the control of the image reading device 100.

For example, when receiving an instruction from the master control unit 6, such as upon press of the start key 31 of the control panel 3, the reading control unit 10 performs the operation control of the image reading device 100 or the control of transmission of image data obtained by reading to the master control unit 6.

The master control unit 6, the original conveyance control unit 20, and the reading control unit 10 correspond to the control unit in claims.

The image reading unit 1 is provided with the wind-up motor 16. The reading control unit 10 is connected to the wind-up motor 16. The reading control unit 10 controls the rotation and stop of the wind-up motor 16 so that the wind-up motor 16 rotates the wind-up drum 16d to move the movable frames (the first movable frame 12 and the second movable frame 13). Furthermore, the reading control unit 10 controls the rotation rate of the wind-up motor 16 to change the rate of movement of the movable frames (i.e., the light source 15 and so on) and thus change the read rate of the document D or the read time per line thereof in the sub scanning direction.

The image reading unit 1 further includes the light source 15, the image sensor 14, an A/D converter 17, a first image processing unit 18, and an image memory 19. The reading control unit 10 is connected to the light source 15, the image sensor 14, the A/D converter 17, and the first image processing unit 18. In reading the original document D, the reading control unit 10 gives these components instructions to start up and controls their operations.

The light source 15 includes the LED lamp 151. For example, the LED lamp 151 includes red, green and blue LEDs and irradiates the original document D with white light. The lamp used for the light source 15 is not limited to LEDs.

As shown in FIG. 4, the light source 15 is provided with a lighting circuit 152 as a switch which can turn the LED lamp 151 on and off. In turning the light source 15 on, the lighting circuit 152 passes an electric current through the LED lamp 151 to produce luminescence at a predetermined amount of light. The light source 15 may be provided with a compensation circuit 153, which includes a light receiving element and a circuit for controlling the current flowing through the LED lamp 151 based on the output of the light receiving element and allows the LED lamp 151 to emit a given amount of light.

The image sensor 14 includes a plurality of line sensors. The line sensors provided are, for example, four types of line sensors having different colors of red (R), green (G), blue (B), and black and white (luminescence, represented as Bk in FIG. 4). The line sensor for each color receives light reflected from the original document D and outputs an analog electric signal for each pixel on a line-by-line basis to read the original document D (the target to be read). The magnitude of the electric signal differs depending on the amount of light received by the line sensor (the amount of light reflected from the original document D). A two-dimensional original document D can be read to the end by repeating the line-by-line reading in the sub scanning direction. Alternatively, luminescence information may be created, without the black and white line sensor, by performing image processing based on the reading results of the line sensors for three colors of R, and B.

The A/D converter 17 receives analog electric signals from all pixels for each line transferred from each line sensor of the image sensor 14 and quantizes the electric signals into digital format. For example, the A/D converter 17 quantizes each of R, B, and black and white into eight to ten bits (32 to 40 bits for all the colors).

The first image processing unit 18 receives image data output by the A/D converter 17 and processes it. In this embodiment, an example is described in which the first image processing unit 18 is provided in the image reading unit 1 and the image processing unit 63 is provided in the master control unit 6. However, only the image processing unit 63 may be provided on the master side to perform both the processings of the first image processing unit 18 and the image processing unit 63 in this description.

The first image processing unit 18 is internally provided with a working memory 181, a lighting control unit 182, a synchronous signal generation unit 183, and an image processing circuit 184. The working memory 181 provides a working region for processing image data and stores image data transferred from the A/D converter 17.

The synchronous signal generation unit 183 generates a synchronous signal for synchronization during reading of the original document D. For example, the synchronous signal generation unit 183 generates a horizontal synchronous signal HSYNC for synchronization with reading of the image sensor 14 for one line. The synchronous signal generation unit 183 changes the period of a horizontal synchronous signal depending on the current rate of movement of the movable frames or the current rate of movement of the target to be read (original document D). The reading control unit 10 causes the synchronous signal generation unit 183 to generate a horizontal synchronous signal each time when the movable frames or the target to be read (original document D) moves in the sub scanning direction a distance of one line to be read by the image sensor 14. The synchronous signal generation unit 183 changes the horizontal synchronous signal according to the read rate (read time per line). In the image reading device 100 of this embodiment, the read time per line (i.e., the period) is set with reference to rising edges (or may be set with reference to falling edges).

For example, the horizontal synchronous signal HSYNC is given to the reading control unit 10, the lighting control unit 182, the image sensor 14, and the A/D converter 17. As an example, in reading the original document, the reading control unit 10 causes the image sensor 14 to time the start/end of charge accumulation to coincide with a horizontal synchronous signal HSYNC, thus complying with a changeover to the next accumulation period and starting the output of an electric signal from a leading pixel of the one line. As another example, in coincidence with a horizontal synchronous signal HSYNC, the A/D converter 17 digitizes the electric signal and outputs image data to the first image processing unit 18. The lighting control unit 182, according to a horizontal synchronous signal HSYNC, continues to turn the light source 15 on for a predetermined fixed lighting time T1 during the read time for each line.

The lighting control unit 182 transmits a lighting instruction signal instructing the lighting state of the light source 15 (LED lamp 151) to the lighting circuit 152 of the light source 15. For example, the lighting control unit 182 is a PWM circuit. The lighting circuit 152 turns the light source 15 on or off based on the state (High or Low) of the lighting instruction signal. Alternatively, no lighting control unit 182 may be provided and instead the reading control unit 10 may control the turning on and off of the light source 15. In the case of provision of the lighting control unit 182, the master control unit 6, the original conveyance control unit 20, the reading control unit 10, and the lighting control unit 182 correspond to the control unit in claims.

The image processing circuit 184 is a circuit that processes image data obtained by reading of the original document D, prior to transmission to the master control unit 6 or the storage unit 62. The image processing performed by the image processing circuit 184 can be appropriately selected. For example, the image processing circuit 184 subjects image data to a processing of correcting distortion derived from characteristics of the light source 15 and the image sensor 14, such as gamma correction or shading correction. The image processing circuit 184 may perform other kinds of image processings, such as filtering or compression. The image data processed by the first image processing unit 18 is stored in the image memory 19 and then transferred to the master control unit 6 or the storage unit 62. The image data transferred to the master control unit 6 or the storage unit 2 is subjected to image processing by a second image processing unit 63 and then, for example, given to the exposure device 51 for printing or transmitted through the communication unit 64 to the computer 300 or other external devices.

(Reading at Reference Read Rate v1)

Figure 5:
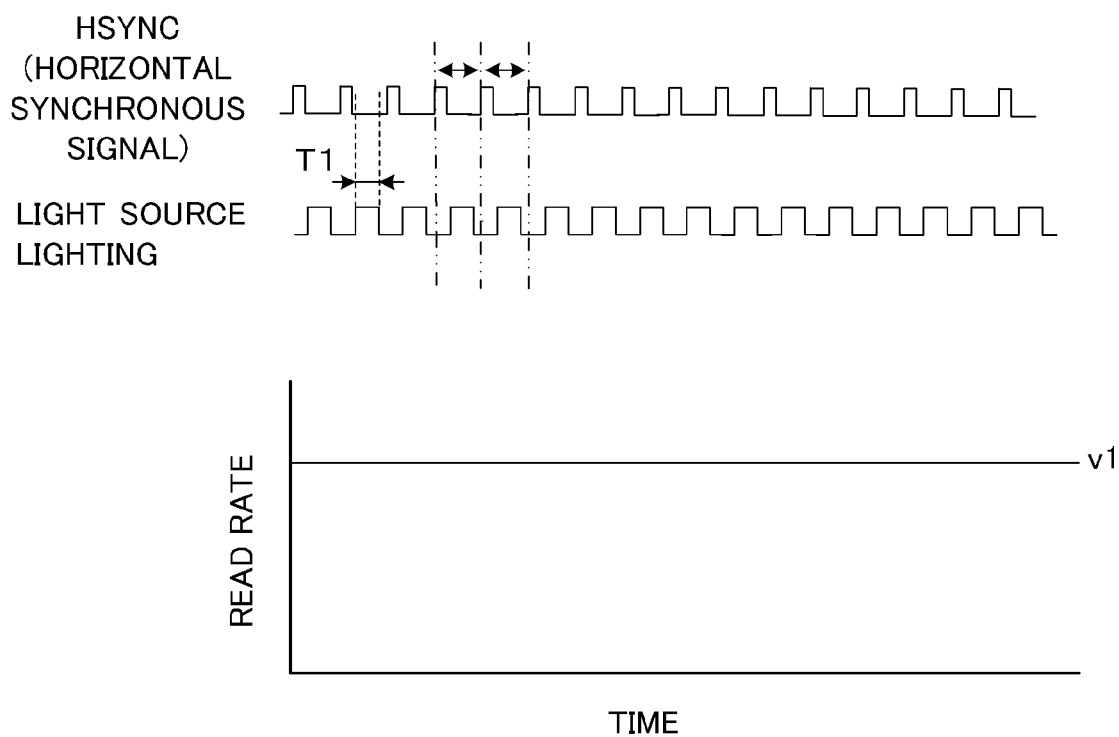
FIG. 5 is a timing chart for illustrating reading at a reference read rate.

A description is next given of reading at a reference read rate v1 in the image reading device 100 according to the first embodiment with reference to FIG. 5. FIG. 5 is a timing chart for illustrating reading at a reference read rate v1.

The image reading of the image reading device 100 is made, as described previously, in either of the following two manners: (1) the light source 15 irradiates all portions of the original document D lying on the contact glass 11b with light by moving in the sub scanning direction relative to the original document D and the image sensor 14 reads the portions of the original document D irradiated with light by the light source 15 line by line, one at a time for the line sensors; and (2) the original conveyance unit 2 moves the original document D in the sub scanning direction relative to the light source 15 positioned below the contact glass 11a in the sub scanning direction and the image sensor 14 reads the portions of the original document D irradiated with light by the light source 15 sequentially line after line, one at a time for the line sensors.

Therefore, the rate of relative movement of the light source 15 to the original document D in (1) and (2) above is the read rate of the image sensor 14. In addition, the image reading device 100 has a predetermined reference (normal) read rate (read time per line). The original conveyance unit 2, the wind-up motor 16, the image sensor 14, and the light source 15 perform an operation of reading the original document D at a reference read rate v1. The image reading device 100 of this embodiment can change the read rate, which will be described later in detail. Before that, a description is first given of reading at a reference read rate v1 (normal read rate) with reference to FIG. 5.

The timing chart at the top of FIG. 5 shows horizontal synchronous signals (the same applies to FIGS. 7 to 12). The timing chart in the middle of FIG. 5 shows turn-ons and turn-offs of the light source 15 (wherein a high indicates a turn-on and a low indicates a turn-off, they can be considered also as lighting instruction signals generated by the lighting control unit 182, and the same applies to FIGS. 7 to 12). The graph at the bottom of FIG. 5 shows a relationship between time and read rate (the same applies to FIGS. 7 to 12) and here shows a state in which the read rate is constant and equal to a reference read rate v1.

For example, in reading the original document D set on the contact glass 11b, the reading control unit 10 causes the wind-up motor 16 to run at a rotation rate at which the read rate is equal to the reference read rate v1 (the read time per line is equal to a reference read time) and keep this rotation rate. On the other hand, in reading the original document D passing over the contact glass 11*a*, the original conveyance control unit 20 causes the original conveyance motor 28 to run at a rate at which the original document D is conveyed so that the read rate can be equal to the reference read rate v1 (the read time per line can be equal to a reference read time) and causes the motor 28 to keep this rotation rate.

While the read rate is kept at the reference read rate v1, as shown by the dash-double-dot lines in FIG. 5, the read time per line of the line sensor (reference read time) of the image sensor 14 is the same for different lines. Therefore, while the reference read rate v1 is maintained, the reading control unit 10 causes the synchronous signal generation unit 183 to generate horizontal synchronous signals equal in period from one rising edge to the next rising edge. In the image reading device 100 of this embodiment, the read time per line (i.e., the period) is set with reference to rising edges (or may be set with reference to falling edges).

The lighting control unit 182 continues to turn the light source 15 on for a predetermined fixed lighting time T1 during the read time for each line. The number of turn-ons per line and the number of turn-offs per line are both one. Since the light source 15 lights at a predetermined amount of light, the amount of light applied from the light source 15 is the same for every line.

(Discrete Lighting During Acceleration and Deceleration)

Figure 6A:
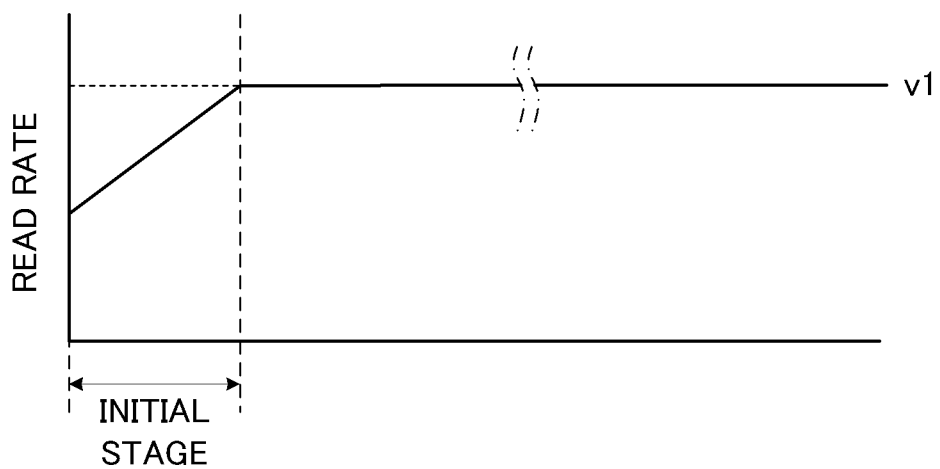
FIG. 6A is a graph illustrating changes in read rate during reading of an original document and shows an exemplary change in read rate during reading of an original document on a contact glass for reading a stationary original document.
Figure 6B:
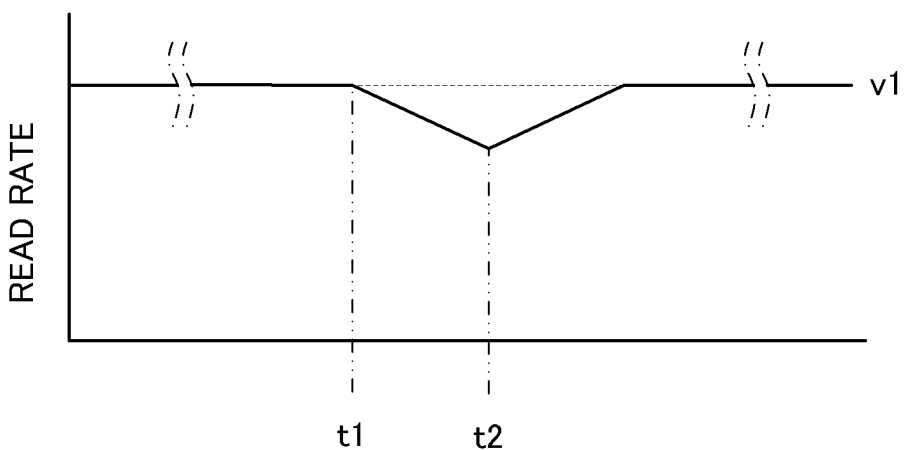
FIG. 6B is a graph illustrating changes in read rate during reading of an original document and shows an exemplary change in read rate for preventing the occurrence of overflow.

A description is next given of lighting of the light source 15 (discrete lighting thereof during acceleration and deceleration) in the image reading device 100 according to the first embodiment with reference to FIGS. 6 to 8. FIGS. 6A and 6B are graphs illustrating changes in read rate during reading of an original document D, wherein FIG. 6A shows an exemplary change in read rate during reading of an original document D on the contact glass 11*b* and FIG. 6B shows an exemplary change in read rate for preventing the occurrence of overflow. FIG. 7 is a graph illustrating an example of lighting during acceleration of the read rate in the image reading device 100 according to the first embodiment. FIG. 8 is a graph illustrating an example of lighting during deceleration of the read rate in the image reading device 100 according to the first embodiment.

First, with reference to FIG. 6A, a description is given of a change in read rate during reading of an original document D set on the contact glass 11*b*. In the image reading device 100 of this embodiment, prior to the reading of the original document D set on the contact glass 11*b*, the movable frames, for example, stand by at their home position. For example, the home position is set closer to the contact glass 11*a* than the contact glass 11*b*. In order to detect whether the movable frames are at the home position, a home position sensor 11*s* (for example, a photosensor configure to detect the position of the movable frames, see FIG. 4) is provided. The reading control unit 10 receives an output of the home position sensor 11*s* to recognize that the movable frames are at the home position.

Then, upon start of reading of the original document D set on the contact glass 11*b*, the reading control unit 10 causes the wind-up motor 16 to run to move the movable frames from the home position to the right (toward the contact glass 11*b*) in the sub scanning direction. Then, when the movable frames reach below the contact glass 11*b*, the reading control unit 10 turns the light source 15 on and causes the image sensor 14 to start reading.

In order to accelerate the rate of movement of the movable frames so that the read rate reaches the reference read rate v1 in a relatively short period of time from the home position to the left end of the contact glass 11*b* (from the start of movement of the movable frames to the start of reading), a high-torque, high-performance motor is needed. Such a motor, however, has demerits such as high price. Instead of this, as shown in FIG. 6A, the reading control unit 10 of the image reading device 100 of this embodiment accelerates the rate of movement of the movable frames containing the light source 15 since it has caused the movable frames to move in the sub scanning direction from the left end of the contact glass 11*b*, even after the movable frames passes through the home position, until the read rate reaches the reference read rate v1. In other words, at the initial stage of reading the reading control unit 10 accelerates the read rate to the reference read rate v1. At the point of time when the read rate reaches the reference read rate v1, the reading control unit 10 principally maintains the rate of movement of the movable frames (maintains the rotation rate of the wind-up motor 16) so that the read rate can be kept at the reference read rate v1. The lighting control unit 182 (reading control unit 10) controls the lighting of the light source 15 during acceleration of the read rate to prevent degradation in image quality even at accelerated read rates, which enables reading without any trouble even using a low-torque motor (as will be described later in detail).

Next, with reference to FIG. 6B, a description is given of changes in read rate after reaching the reference read rate v1.

Image data obtained by reading is stored in the image memory 19 of the image reading device 100 and then output to the master control unit 6 or the storage unit 62 which are located on the master side.

In this case, the read rate may have to be decreased to avoid the occurrence of overflow in the image memory 19. For example, if, during use of the multifunction peripheral 200 as a scanner, the process load of the master control unit 6 becomes large or the rate of transmission of image data to the computer 300 becomes low, the output rate (transmission rate) of the image data from the image memory 19 may be delayed.

Because the image memory 19 has a limited capacity, a large delay of the output rate of the image data will induce the image memory 19 to overflow. If the overflow occurs, part of the image data obtained by reading will be lost. Such overflow may occur in both the case where the original document D on the contact glass 11*b* is read and the case where the original document D being conveyed by the original conveyance unit 2 is read. If the rate of creation of image data is decreased, the occurrence of overflow can be avoided. To this end, when overflow of the image memory 19 is likely to occur (for example, when the residual capacity of the image memory 19 falls below a threshold, such as at the point t1 in FIG. 6B), the reading control unit 10 of this embodiment controls the original conveyance motor 28 or the wind-up motor 16, the image sensor 14, and so on to decrease the read rate as shown in FIG. 6B.

Then, when it can be determined that although reading is conducted at the reference read rate v1, the image memory 19 has no longer overflowed (for example, when the residual capacity of the image memory 19 exceeds the threshold, such as at the point t2 in FIG. 6B), the reading control unit 10 accelerates the read rate to return the read rate to the reference read rate v1.

In the above manner, the image reading device 100 of this embodiment accelerates and decelerates the read rate. During the time, in order to keep the amount of light entering the line of each line sensor of the image sensor 14 constant for all the lines, the lighting control unit 182 (reading control unit 10) causes the light source 15 to light up, as for within the read time per line, at a given amount of light for a fixed lighting time T1 regardless of the above read rate. The read time per line refers to the time which during a read operation it takes for the light source 15 and the movable frames to move the width of one line in the sub scanning direction under the control of the reading control unit 10 over the wind-up motor 16.

In the image reading device 100 of this embodiment, the lighting control unit 182 controls the light source 15 to turn it on and off a plurality of times within a period of one line so that the irradiation range in the sub scanning direction of the light source 15 moving the width of one line during acceleration or deceleration of the read rate of the image reading device 100 can come close to the irradiation range in the sub scanning direction of the light source 15 moving the width of one line at the reference read rate v1. The irradiation range refers to the read range within which the image sensor 14 reads the image of the original document in the sub scanning direction while the light source 15 is moving the width of one line.

FIG. 7 shows exemplary turn-ons and turn-offs of the light source 15 during acceleration of the read rate, together with a graph of the read rate. FIG. 8 shows exemplary turn-ons and turn-offs of the light source 15 during deceleration of the read rate, together with a graph of the read rate.

As described previously, the reading control unit 10 causes the synchronous signal generation unit 183 to generate a horizontal synchronous signal each time when the movable frames or the target to be read (original document D) moves in the sub scanning direction a distance of one line to be read by the image sensor 14. Therefore, during acceleration of the read rate, the period of a horizontal synchronous signal (the read time per line), as shown in FIG. 7, gradually decreases with increasing read rate. On the other hand, during deceleration of the read rate, the period of a horizontal synchronous signal (the read time per line), as shown in FIG. 8, gradually increases with decreasing read rate.

In this embodiment, if the read time per line of the image sensor 14 becomes longer than the reference read time, the lighting control unit 182 causes the light source 15 to discretely light up a plurality of times within the read time per line. Although the examples shown in FIGS. 7 and 8 are those in which the light source 15 discretely lights up twice or three times per line, no particular limitation is placed on the number of discrete turn-ons per line and it may be four or more times. In order to equalize the amount of light applied per line from the light source 15 for all the lines, the lighting control unit 182 causes the light source 15 to discretely light up so that the total lighting time per line is equal to the fixed lighting time T1.

For example, the amount of light applied from the light source 15 can be equalized for all the lines also if the light source 15 lights up only once over the fixed lighting time T1 during reading of one line regardless of the above read rate of the image sensor 14. However, if the light source 15 lights up only once over the fixed lighting time T1 under the condition that the read time per line is longer than the reference read time (the read rate is lower than the reference read rate v1), a smaller amount of movement of the movable frames or the target to be read (original document D) in the sub scanning direction over the fixed lighting time T1 results in a decreased read section per line (read width per line in the sub scanning direction or read section from a first turn-on (lighting start point) of the light source 15 to a final turn-off (lighting end point) thereof during reading of one line), as compared with when the image sensor 14 reads at the reference read rate v1. Unlike this, in this embodiment, if the read rate of the image sensor 14 is lower than the reference read rate v1, the lighting control unit 182 causes the light source 15 to discretely light up as described above to extend the read section from a first turn-on of the light source 15 to a final turn-off thereof during reading of one line and thus bring the read section close to the read section during reading at the reference read rate v1.

Furthermore, in the image reading device 100 of this embodiment, in reading one line during acceleration or deceleration, the lighting control unit 182 causes the light source 15 to discretely light up within a period of time from a point corresponding to the lighting start point of the light source 15 to a point corresponding to the lighting end point thereof in the case of reading at the reference read rate v1.

In addition, as shown in FIGS. 7 and 8, the lighting control unit 182 causes the light source 15 to be turned on once at the above point within a period of one line corresponding to the lighting start point of the light source 15 in the case of reading at the reference read rate v1, then turned off, start lighting before the point corresponding to the lighting end point of the light source 15 in the case of reading at the reference read rate v1, and then end the lighting at the point corresponding to the lighting end point.

For example, suppose that if the read rate of the image sensor 14 is being accelerated as shown in FIG. 7, the timing of start of lighting of the light source 15 in the case of reading at the reference read rate v1 within the read range in the sub scanning direction for one line is a point of time after a lapse of a period of time t3 since the rising edge of the horizontal synchronous signal. When the read rate of the image sensor 14 is a read rate v2 lower than the reference read rate v1, the lighting control unit 182 sets the timing of start of lighting of the light source 15 at a point of time after a lapse of a period of time t4 since the rising edge of the horizontal synchronous signal and delayed depending on the amount of change in the read rate v2 from the reference read rate v1. The elapsed time t4 is calculated by the reading control unit 10 or the lighting control unit 182 from, for example, the following equation: Elapsed time t4=(Elapsed time t3)×(Reference read rate v1/Read rate v2).

On the other hand, if the read rate of the image sensor 14 is being decelerated as shown in FIG. 8, the timing of end of lighting of the light source 15 is calculated like the calculation of the timing of start of lighting of the light source 15. Specifically, suppose that the timing of end of lighting of the light source 15 in the case of reading at the reference read rate v1 is a point of time after a lapse of a period of time t5 since the rising edge of the horizontal synchronous signal. When the read rate of the image sensor 14 is a read rate v3 lower than the reference read rate v1, an elapsed time t6 indicating the timing of end of lighting of the light source 15 is calculated by the reading control unit 10 or the lighting control unit 182 from, for example, the following equation: Elapsed time t6= (Elapsed time t5)×(Reference read rate v1/Read rate v3).

In the above manners, even if the read rate of the image sensor 14 is being accelerated or decelerated, the read section per line of the image sensor 14 (the read width per line in the sub scanning direction or the read section from a first turn-on of the light source 15 to a final turn-off thereof during reading of one line) can be matched to that during reading at the reference read rate v1. This eliminates a significant difference between the reading result during acceleration or deceleration and the reading result at the reference read rate v1, such as a concentration difference between image data elements due to a change in read rate, and avoids degradation in image quality due to a change in read rate.

Alternatively, the reading control unit 10 or the lighting control unit 182 may control the read rate of the image sensor 14 (the rate of movement of the light source 15 and the movable frames) and the timing of discrete lighting of the light source 15 in the following manners.

For example, in relation to acceleration of the read rate of the image sensor 14, data elements about at which rate the acceleration is made and data elements indicating the transition of read times for lines (periods of horizontal synchronous signals) during acceleration are previously determined. Also prepared are data elements, for various read times per line during acceleration of the read rate, specifying the points corresponding to the lighting start point and lighting end point of the light source 15 in the case of reading at the reference read rate v1. These data elements are stored in a non-volatile memory 10*a* (see FIG. 4) provided in the image reading device 100. Then, the reading control unit 10 or the lighting control unit 182 performs the acceleration of the read rate and discrete lighting in a predetermined pattern (steps or procedure) based on the data stored in the memory 10*a*. Thus, even when the read rate is accelerated, the reading start point and end point within a period of one line can be surely matched to those during reading at the reference read rate v1.

Likewise, for example, in relation to deceleration of the read rate of the image sensor 14, data elements about at which rate the deceleration is made and data elements indicating the transition of read times for lines (periods of horizontal synchronous signals) during deceleration are previously determined. Also prepared are data elements, for various read times per line during deceleration of the read rate, specifying the points corresponding to the lighting start point and lighting end point of the light source 15 in the case of reading at the reference read rate v1. These data elements are stored in the non-volatile memory 10*a* (see FIG. 4) provided in the image reading device 100. Then, the reading control unit 10 or the lighting control unit 182 performs the deceleration of the read rate and discrete lighting in a predetermined pattern (steps or procedure) based on the data stored in the memory 10*a*. Thus, even when the read rate is decelerated, the reading start point and end point within a period of one line can be surely matched to those during reading at the reference read rate v1. Alternatively, the reading control unit 10 or the lighting control unit 182 may perform calculations according to the changing periods of horizontal synchronous signals during deceleration to determine the points of time at which discrete lighting is done and cause the light source 15 to discretely light up in time with the determined points of time.

In the above manners, in the image reading device 100 of this embodiment, during reading one line having a predetermined width in the sub scanning direction, under the control of the master control unit 6, the original conveyance control unit 20, the reading control unit 10, and the lighting control unit 182 each serving as the control unit in Claims, the light source 15 lights up at a predetermined amount of light for a predetermined fixed lighting time T1 to irradiate the target to be read with light, the image sensor 14 containing a plurality of photoelectric conversion elements reads the target to be read line by line, one at a time for each line sensor, based on the reflected light from the target to be read, and the transport unit (the wind-up motor 16, the wind-up drum 16*d*, the wires 16*w*, the original conveyance unit 2 and so on) changes the rate of movement of the light source 15 or the target to be read to change the read time per line and the read rate. Then, while the control unit causes the transport unit to accelerate the read rate to the reference read rate v1 which is a read rate at which the read time per line is the predetermined reference read time or decelerate the read rate from the reference read rate v1, the control unit causes the image sensor 14 to read the target to be read one line at a time depending on the read time per line varying with changes in read rate and causes the light source 15 to light up, within the read time, with timing brought close to the read section from the lighting start point to the lighting end point in the case of reading the one line in the reference read time. In other words, the control unit causes the light source 15 to light up over a read section brought close to the read section in the case of reading the one line in the reference read time.

In this case, as described above, the light source 15 lights up at the predetermined amount of light within the above period of one line, and the time for which the light source 15 irradiates the original document D with light within the read time per line is constant and equal to the fixed lighting time T1 even if the read rate of the image sensor 14 is lower than the reference read rate v1. Therefore, even if the light source 1 discretely lights up according to changes in read rate of the image sensor 14 as described above, the amount of light applied per line from the light source 15 is constant. In other words, the maximum possible amount of light received by the image sensor 14 is constant for all the lines regardless of the read rate. Therefore, there is no concentration difference among the lines due to differences in amount of charge accumulated in the image sensor 14 caused by changes in read rate.

Furthermore, the read range within which the image sensor 14 reads within a period of one line during acceleration or deceleration of the read rate is brought close to the read range during reading at the reference read rate v1. Therefore, the reading of the original document can be performed so that there is no sense of difference in concentration and so on between the reading result (image data) obtained by reading at a read rate different from the reference read rate v1 and the reading result (image data) obtained by reading at the reference read rate v1. Hence, even if the read rate is changed during reading of a sheet of original document, unlike the conventional technique, any change and degradation of the reading result (image data) during acceleration or deceleration of the read rate can be avoided and demerits to image quality derived from changes in read rate can be eliminated to increase the image quality.

Moreover, if the lighting time per line of the light source 15 is fixed and the lighting within a period of one line is done only once, the read section per line for which the light source 15 lights up (the read width per line in the sub scanning direction or the read section from the start of lighting of the light source 15 to the end of lighting thereof within the period of one line) becomes relatively narrow as the read rate decreases. To cope with this, in the image reading device 100 of this embodiment, as described above, while the transport unit (the wind-up motor 16, the wind-up drum 16*d*, the wires 16*w*, the original conveyance unit 2 and so on) accelerates the read rate to the reference read rate v1 or decelerates the read rate from the reference read rate v1, the lighting control unit 182 causes the light source 15 to discretely light up a plurality of times within the read time per line so that the total lighting time is equal to the fixed lighting time T1.

Thus, even if the read rate is lower than the reference read rate v1, the read section from a first turn-on of the light source 15 to a final turn-off thereof during reading of one line can be extended. Therefore, even if the read rate is lower than the reference read rate v1, the reading can be performed not over a localized range within the read width per line but over the same wide range as the read section during reading at the reference read rate v1. In other words, the readability during acceleration or deceleration of the read rate can be brought close to the readability at the reference read rate v1. Therefore, unlike the conventional technique, any change and degradation of a portion (image data) read during acceleration or deceleration of the read rate from a portion (image data) read at the reference read rate v1 can be avoided and demerits to image quality derived from changes in read rate can be eliminated to increase the image quality.

Furthermore, in the image reading device 100 of this embodiment, as described above, the light source 15 discretely lights up within a section corresponding to the section from the lighting start point to the lighting end point within a period of one line in the case of reading at the reference read rate v1. Thus, even if the read rate is lower than the reference read rate v1, light can be applied to the same range within a period of one line as the range to which light is applied (the read range) during reading at the reference read rate v1 so that the original document D can be read as the target to be read. In other words, the read range within a period of one line at a read rate lower than the reference read rate v1 can be surely brought close to the read range at the reference read rate v1.

Moreover, in the image reading device 100 of this embodiment, as described above, when discretely lighting up, the light source 15 is turned on at a point corresponding to the lighting start point within a period of one line in the case of reading at the reference read rate v1, then turned off, then starts the lighting before a point corresponding to the lighting end point in the case of reading at the reference read rate v1, and is turned off at the point corresponding to the lighting end point in the case of reading at the reference read rate v1. Thus, even if the read rate is lower than the reference read rate v1, the irradiation of light can be started and ended in the same range within a period of one line as the range irradiated with light (the read range) during reading at the reference read rate v1. In other words, the read range within a period of one line at a read rate lower than the reference read rate v1 can be quasi-equal to the read range at the reference read rate v1.

In an image forming apparatus, as described above, the read rate of an image reading device is increased and decreased in order to prevent overflow and the like on buffering of read image data. One challenge is that such increase and decrease in read rate requires accurate and appropriate control of light application of the light source to the original document according to changes in read time per line of the image sensor. The image reading device 100 according to this embodiment can solve this challenge as described above.

There is also a conventional image forming apparatus that includes a light emitting element for controlling the voltage (amount of current) applied to a light source using a plurality of resistors to control the amount of light by voltage. However, if the amount of light is controlled in this manner, it will be significantly affected by variations in resistance of the light source and the resistors. Aging deterioration of the light source also significantly affects the amount of light. Furthermore, the amount of light is not necessarily linearly changed by controlling the voltage and it is difficult to control the amount of light of the light source to a desired amount precisely proportional to the read rate. Therefore, in the conventional image forming apparatus, even if reading is done by actually changing the read rate, concentration differences (differences in amount of light applied per line from the light source) occur depending on the read rate, which makes it difficult to normally read the original document in respect of image quality. Hence, the conventional image forming apparatus cannot be said to have the ability to accurately and appropriately control light application to the original document according to changes in read time per line and cannot solve the above challenge.

In contrast, in the image reading device 100 of this embodiment, even when the read rate is accelerated or decelerated, the amount of light applied per line from the light source 15 can be kept unchanged and concurrently the read section (range) per line for which the image sensor 14 performs reading can be brought close to the read section during reading at the reference read rate to increase the image quality.

Furthermore, the image forming apparatus (multifunction peripheral 200) includes the image reading device 100 according to the above embodiment. The image forming apparatus (multifunction peripheral 200) includes the image reading device 100 in which, as compared with the conventional technique, the change and degradation of the reading result (image data) during acceleration or deceleration of the read rate can be reduced and demerits to image quality derived from changes in read rate can be eliminated to increase the image quality. Therefore, the image forming apparatus (multifunction peripheral 200) can perform printing and other image forming processes based on high-quality image data, which provides a high-quality image forming apparatus (multifunction peripheral 200).

Second Embodiment

Figure 10:
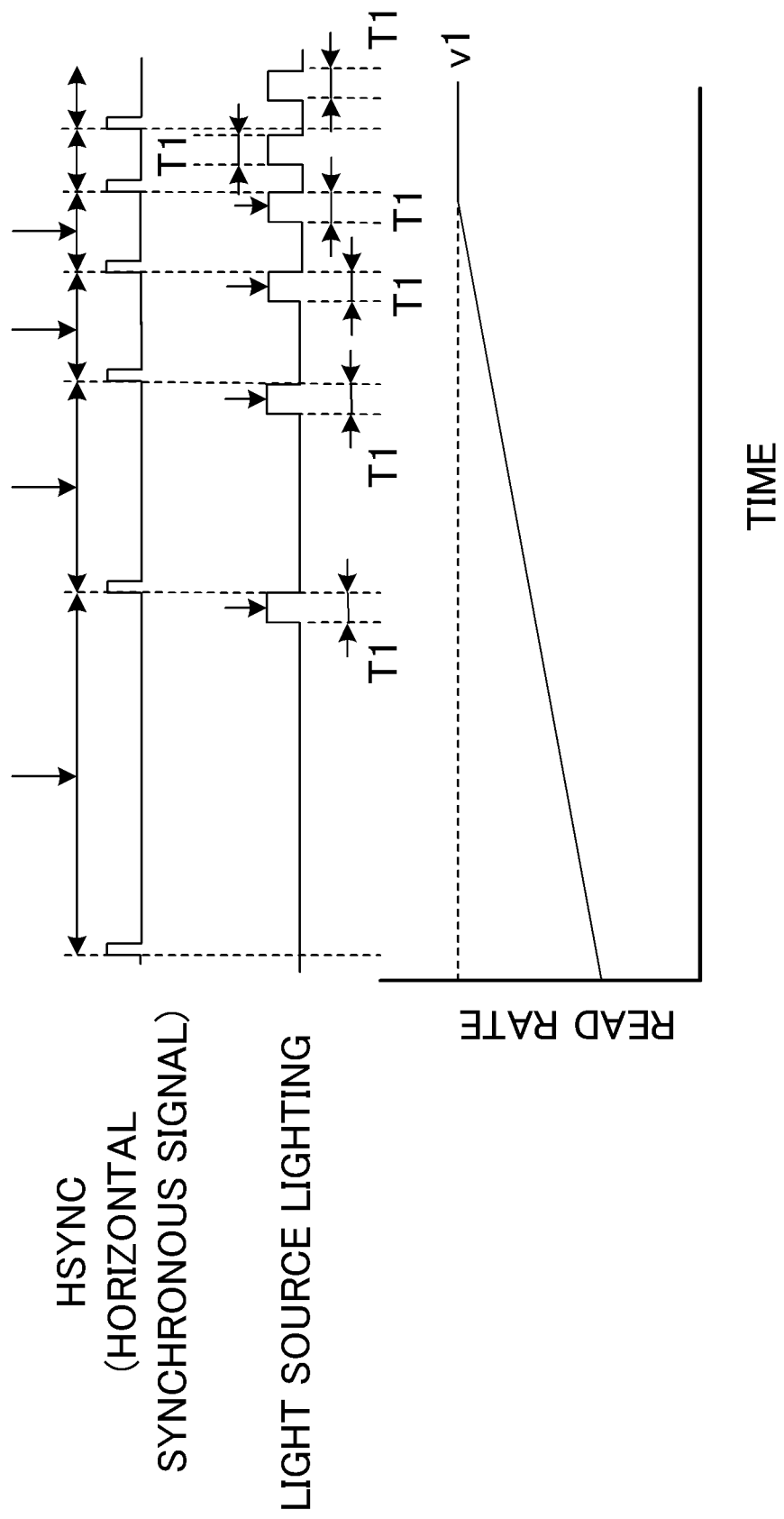
FIG. 10 is a graph illustrating the example of lighting during acceleration of the read rate in the image reading device according to the second embodiment.
Figure 11:
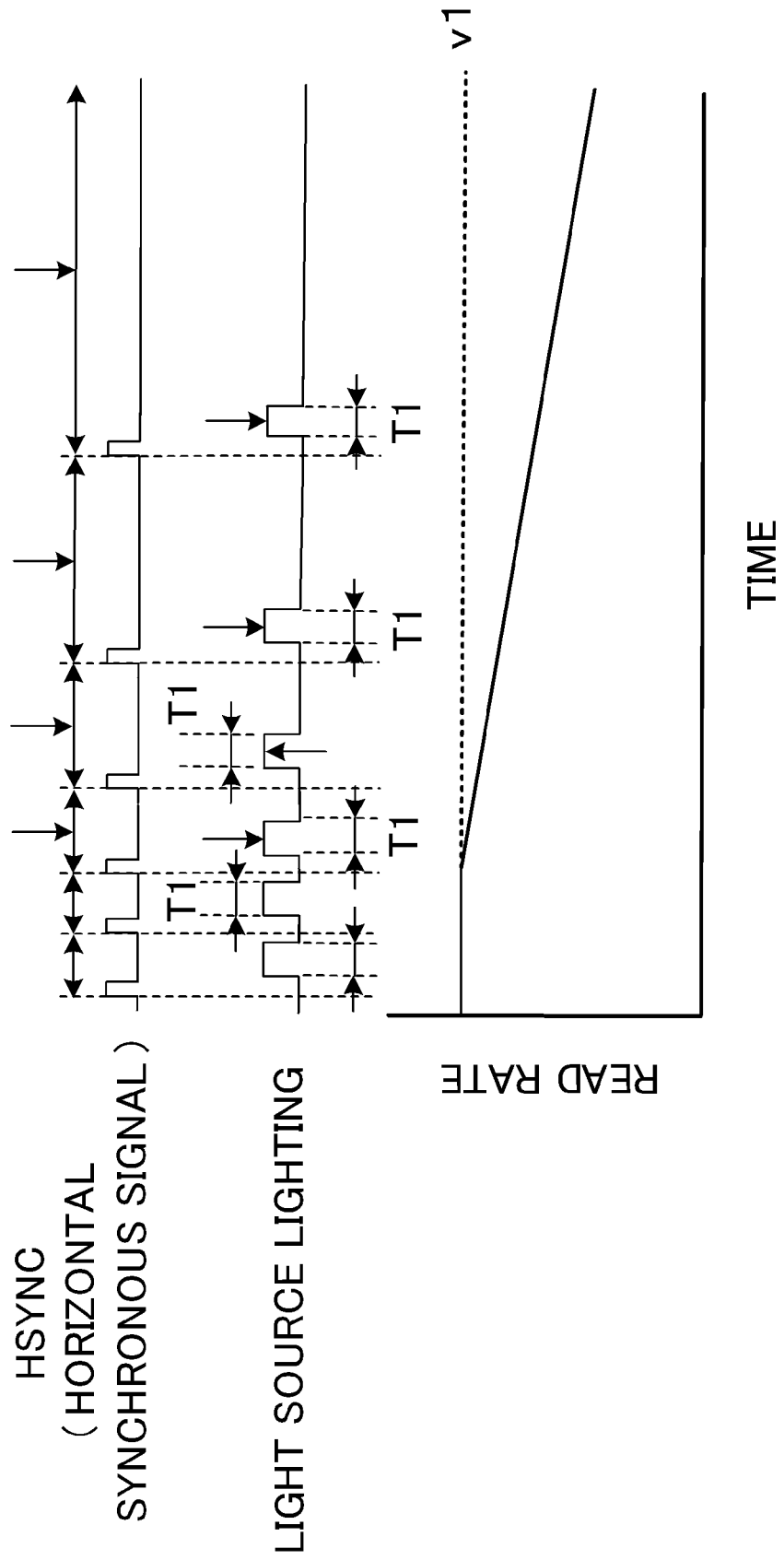
FIG. 11 is a graph illustrating an example of lighting during deceleration of the read rate in the image reading device according to the second embodiment.
Figure 12:
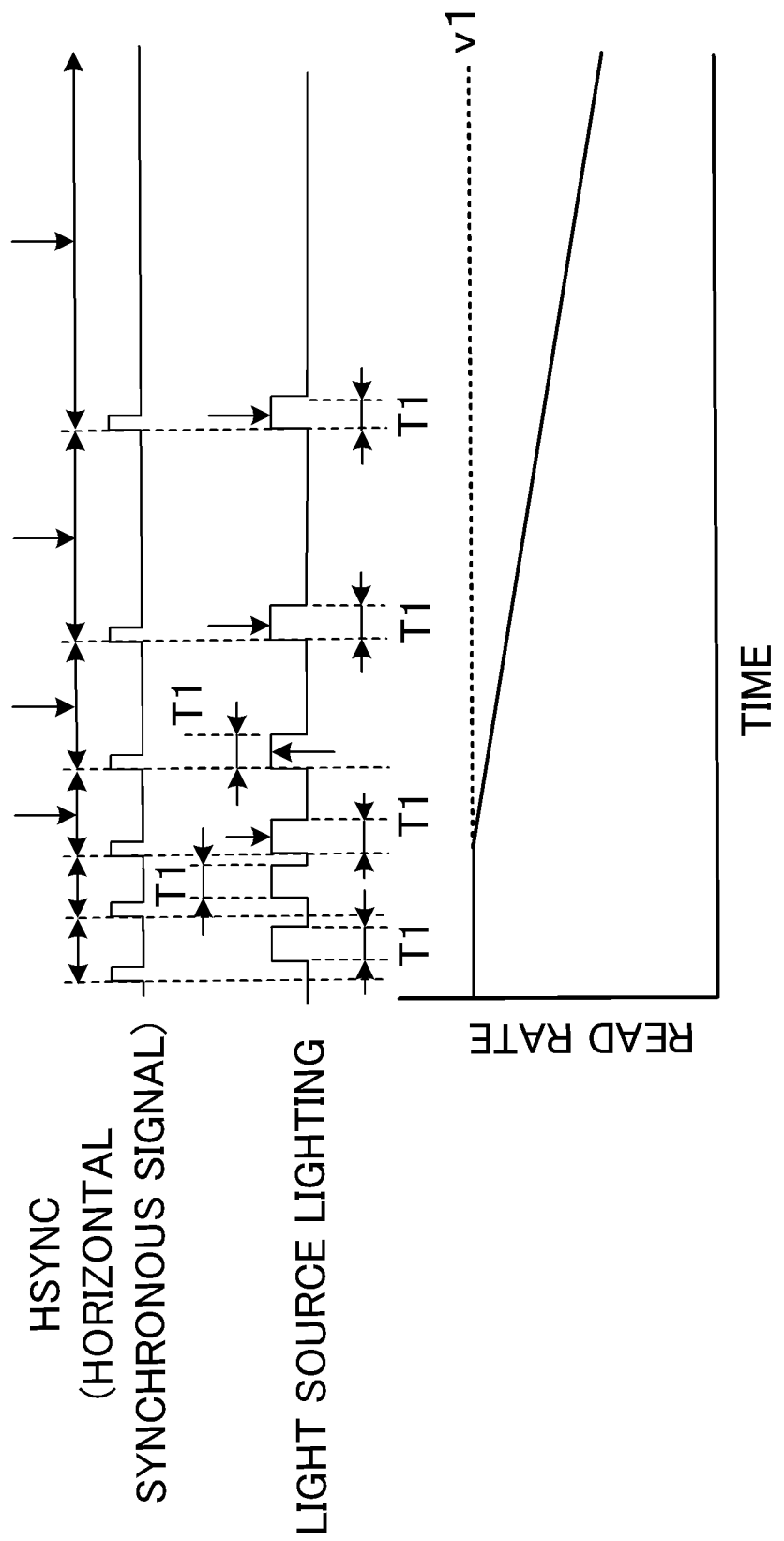
FIG. 12 is a graph illustrating the example of lighting during deceleration of the read rate in the image reading device according to the second embodiment.

A description is next given of lighting of a light source 15 in an image reading device 100 according to a second embodiment with reference to FIGS. 9 to 12. FIGS. 9 and 10 are graphs illustrating an example of lighting during acceleration of the read rate in the image reading device 100 according to the second embodiment. FIGS. 11 and 12 graphs illustrating an example of lighting during deceleration of the read rate in the image reading device 100 according to the second embodiment.

The second embodiment is different from the first embodiment in the manner of controlling lighting of the light source 15 during acceleration or deceleration of the read rate of the image sensor 14. For the rest, the image reading device 100 and an image forming apparatus therewith are the same as those of the first embodiment. Therefore, the description in the first embodiment can be applied to the second embodiment except as specifically discussed below and the description and graphic illustration of the rest are not given here.

A description is first given of the case where the read rate is accelerated to the reference read rate v1 with reference to FIG. 9. The second embodiment is different from the first embodiment (discrete lighting) in that while the read rate is being accelerated as well as while reading is being done at the reference read rate v1, the lighting control unit 182 causes the light source 15 to be turned on and off once in the fixed lighting time T1 during reading of the image sensor 14 for one line. Furthermore, the second embodiment is different from the first embodiment in that the lighting control unit 182 causes the light source 15 to be turned on and off so that the midpoint of the fixed lighting time T1 (the point of time indicated by each of the arrows in "LIGHT SOURCE LIGHTING" in FIG. 9) gets behind the midpoint of the read time per line during acceleration (the point of time indicated by each of the arrows in "HORIZONTAL SYNCHRONOUS SIGNAL" in FIG. 9).

As shown in FIG. 9, during the read time per line represented by a period of the rising edge (shown by the broken line) of the horizontal synchronous signal, the lighting control unit 182 causes the light source 15 to be turned on and off once in the fixed lighting time T1.

Then, as shown in FIG. 9, if the read rate is lower than the reference read rate v1, the read section in the sub scanning direction for which light is applied by lighting in the fixed lighting time T1 becomes shorter (narrower) than during reading at the reference read rate v1, but with increasing read rate the read section per line (the range irradiated with light)

can be extended in the sub scanning direction by an increase in the read rate by the lighting of the light source 15. In other words, if the light source 15 is lit when the read rate is higher and closer to the reference read rate v1, the read section per line can be brought closer to the read section at the reference read rate v1. Therefore, during acceleration of the read rate, the lighting control unit 182 causes the light source 15 to be turned on at such a point of time that the midpoint of the fixed lighting time T1 is behind the midpoint of the read time per line during acceleration so that the read rate comes relatively close to the reference read rate v1.

If in the above manner the light source 15 is turned on so that the midpoint of the fixed lighting time T1 is behind the midpoint of the read time per line during acceleration, this enables the image sensor 14 to perform reading when the read rate comes relatively close to the reference read rate v1 during reading of the one line. This provides the effect of bringing the read section at the read rate during acceleration close to the read section at the reference read rate v1.

To execute the above control, for example, in relation to acceleration of the read rate, data elements about at which rate the acceleration is made and data elements indicating the transition of read times for lines (periods of horizontal synchronous signals) during acceleration are previously determined. Also prepared are data elements, for various read times per line during acceleration of the read rate, specifying the point of time (the elapsed time since the rising edge of the horizontal synchronous signal) at which the light source 15 is to be turned on so that the midpoint of the fixed lighting time T1 is behind the midpoint of the read time per line during acceleration. These data elements are stored in the non-volatile memory 10a (see FIG. 4) provided in the image reading device 100. Then, the reading control unit 10 or the lighting control unit 182 performs the acceleration of the read rate and lighting in a predetermined pattern (steps or procedure) based on the data stored in the memory 10a. Thus, even when the read rate is accelerated, the range within a period of one line in the sub scanning direction to be irradiated with light can be extended.

So long as in executing the above control the timing at when the lighting control unit 182 causes the light source 15 to be turned on is selected so that the midpoint of the fixed lighting time T1 is behind the midpoint of the read time per line during acceleration, the above effect can be achieved. However, for example, as shown in FIG. 10, the lighting control unit 182 may cause the light source 15 to be turned on, in each low period of the horizontal synchronous signal which is a time range for lighting of the light source 15, at a point of time the fixed lighting time T1 before the end of the read time per line during acceleration and then turned off at the end of the read time per line. In other words, the lighting control unit 182 may cause the light source 15 to light up as late as possible within the period of the line without overlapping with the next line. In the case where, the lighting control unit 182 select, as the timing of end of lighting of the light source 15, the rising edge of the horizontal synchronous signal representing the start of a reading time for the next line, this provides the effect of maximally securing the read section at the current read rate to bring the read section still closer to the read section at the reference read rate v1. Preferably, for every line during acceleration of the read rate, the lighting control unit 182 executes the control of causing the light source 15 to be turned on at a point of time the fixed lighting time T1 before the end of the read time per line and then turned off at the end of the read time.

A description is next given of the case where the read rate is decelerated from the reference read rate v1 with reference to FIG. 11. In FIG. 11, the midpoint of the fixed lighting time T1 and the midpoint of the read time per line are shown by the solid arrows.

This embodiment is different from the first embodiment (discrete lighting) in that while the read rate is being decelerated, the lighting control unit 182 causes the light source 15 to be turned on and off once in the fixed lighting time T1 during reading of one line. Furthermore, this embodiment is different from the first embodiment in that the lighting control unit 182 causes the light source 15 to be turned on and off so that the midpoint of the fixed lighting time T1 gets ahead of the midpoint of the read time per line during deceleration.

As shown in FIG. 11, during the read time per line represented by a period of the rising edge (shown by the broken line) of the horizontal synchronous signal, the lighting control unit 182 causes the light source 15 to light up once over the fixed lighting time T1.

Then, as shown in FIG. 11, if the read rate is lower than the reference read rate v1, the read section in the sub scanning direction for which light is applied by lighting in the fixed lighting time T1 becomes shorter (narrower) than during reading at the reference read rate v1, but with increasing read rate the read section per line (the range irradiated with light) can be extended in the sub scanning direction by an increase in the read rate by the lighting of the light source 15. In other words, if the light source 15 is lit when the read rate is higher and closer to the reference read rate v1, the read section per line can be brought closer to the read section at the reference read rate v1. Therefore, during deceleration of the read rate, the lighting control unit 182 causes the light source 15 to be turned on at such a point of time that the midpoint of the fixed lighting time T1 shown by the solid arrow in FIG. 11 is ahead of the midpoint of the read time per line during deceleration so that the read rate becomes relatively close to the reference read rate v1.

If in the above manner the light source 15 is turned on so that the midpoint of the fixed lighting time T1 is ahead of the midpoint of the read time per line during deceleration, this enables the image sensor 14 to perform reading when the read rate comes relatively close to the reference read rate v1 during reading of the one line. This provides the effect of bringing the read section at the read rate during deceleration close to the read section at the reference read rate v1.

To execute the above control, for example, in relation to deceleration of the read rate, data elements about at which rate the deceleration is made and data elements indicating the transition of read times for lines (periods of horizontal synchronous signals) during deceleration are previously determined. Also prepared are data elements, for various read times per line during deceleration of the read rate, specifying the point of time (the elapsed time since the rising edge of the horizontal synchronous signal) at which the light source 15 is to be turned on so that the midpoint of the fixed lighting time T1 is ahead of the midpoint of the read time per line during deceleration. These data elements are stored in the non-volatile memory 10a (see FIG. 4) provided in the image reading device 100. Then, the reading control unit 10 or the lighting control unit 182 performs the deceleration of the read rate and lighting in a predetermined pattern (steps or procedure) based on the data stored in the memory 10a. Thus, even when the read rate is decelerated, the range within a period of one line in the sub scanning direction to be irradiated with light can be extended.

So long as in executing the above control the timing at when the lighting control unit 182 causes the light source 15 to be turned on is selected so that the midpoint of the fixed lighting time T1 is ahead of the midpoint of the read time per line during deceleration, the above effect can be achieved. However, for example, as shown in FIG. 12, the lighting control unit 182 may cause the light source 15 to be turned on at the start of the read time per line during deceleration, lit over the fixed lighting time T1, and then turned off. In other words, the lighting control unit 182 may cause the light source 15 to be turned on concurrently with the transition from one line to the next. In the case where, the lighting control unit 182 select, as the timing of start of lighting of the light source 15, the rising edge of the horizontal synchronous signal representing the start of a reading time for the current line, this provides the effect of maximally securing the read section at the current read rate to bring the read section still closer to the read section at the reference read rate v1. Preferably, for every line during deceleration of the read rate, the lighting control unit 182 executes the control of causing the light source 15 to be turned on at the start of the read time per line, lit over the fixed lighting time T1, and then turned off.

As seen from the above, the image reading device 100 of this embodiment can provide the same effects as described in the first embodiment.

In addition, as described above, when the read rate is accelerated, the read rate comes closer to the reference read rate v1 as the read time per line is later in (closer to the end of) the period of the line. Therefore, while the transport unit (the wind-up motor 16, the wind-up drum 16d, the wires 16s, the original conveyance unit 2 and so on) accelerates the read rate to the reference read rate v1, the lighting control unit 182 causes the light source 15 to light up once during reading of the one line so that the midpoint of the fixed lighting time T1 gets behind the midpoint of the read time per line during acceleration. Thus, while the image sensor 14 is reading one line of the original document D, the original document D is irradiated with light at a point of time at which the read rate becomes relatively high. Therefore, even if the read rate is lower than the reference read rate v1, the read section per line of the image sensor 14 can be a read section of a wide range like during reading at the reference read rate v1. In other words, the readability during acceleration of the read rate can be brought close to the readability at the reference read rate v1. Therefore, unlike the conventional technique, any change and degradation of a portion (image data) read during acceleration of the read rate from a portion (image data) read at the reference read rate v1 can be avoided and demerits to image quality derived from changes in read rate can be eliminated to increase the image quality.

Furthermore, as described above, when the read rate is decelerated, the read rate comes closer to the reference read rate v1 as the read time per line is earlier in (closer to the start of) the period of the line. Therefore, while the transport unit (the wind-up motor 16, the wind-up drum 16d, the wires 16s, the original conveyance unit 2 and so on) decelerates the read rate from the reference read rate v1, the lighting control unit 182 causes the light source 15 to light up once during reading of the one line so that the midpoint of the fixed lighting time T1 gets ahead of the midpoint of the read time per line during deceleration. Thus, while the image sensor 14 is reading one line of the original document D, the original document D is irradiated with light at a point of time at which the read rate becomes relatively high. Therefore, even if the read rate is lower than the reference read rate v1, the read section per line of the image sensor 14 can be a read section of a wide range like during reading at the reference read rate v1. In other words, the readability during deceleration of the read rate can be brought close to the readability at the reference read rate v1. Therefore, unlike the conventional technique, any change and degradation of a portion (image data) read during deceleration of the read rate from a portion (image data) read at the reference read rate v1 can be avoided and demerits to image quality derived from changes in read rate can be eliminated to increase the image quality.

Moreover, as described above, while the transport unit accelerates the read rate to the reference read rate v1, the lighting control unit 182 causes the light source 15 to be turned on at a point of time the fixed lighting time T1 before the end of the read time per line during acceleration and then turned off at the end of the read time. Thus, even if the read rate is lower than the reference read rate v1, the read section per line of the image sensor 14 can be maximally extended.

On the other hand, while the transport unit decelerates the read rate from the reference read rate v1, the lighting control unit 182 causes the light source 15 to be turned on at the start of the read time per line during deceleration, lit over the fixed lighting time T1, and then turned off. Thus, even if the read rate is lower than the reference read rate v1, the read section per line of the image sensor 14 can be maximally extended.

The present disclosure is widely applicable to image reading devices operable to change the read rate and image forming apparatuses equipped with such an image reading device.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An image reading device comprising:
a light source configured to irradiate a target to be read with light;
an image sensor that includes a plurality of photoelectric conversion elements and is configured to read, based on reflected light from the target to be read, the target to be read for each line having a predetermined width in a sub scanning direction;
a transport unit configured to move the light source or the target to be read in the sub scanning direction; and
a control unit that, during the reading of the target to be read by the image sensor, causes the light source to light up at a predetermined amount of light for a predetermined fixed lighting time and causes the transport unit to move to change a read time per line and a read rate of the image sensor,
wherein while, during the reading of the target to be read by the image sensor, the control unit causes the transport unit to accelerate the read rate to a reference read rate which is the read rate at which the read time per line is a predetermined reference read time or to decelerate the read rate from the reference read rate, the control unit causes the light source to light up, within the read time, with timing brought close to a read section from a lighting start point to a lighting end point in the case of reading the one line in the reference read time.

2. The image reading device according to claim 1, wherein while the control unit causes the transport unit to accelerate the read rate to the reference read rate or decelerate the read rate from the reference read rate, the control unit causes the light source to discretely light up a plurality of times within the read time per line so that a total lighting time of the light source within the read time per line is the fixed lighting time.

3. The image reading device according to claim 2, wherein the control unit causes the light source to discretely light up within a section corresponding to the read section from the lighting start point to the lighting end point in the case of reading the one line in the reference read time.

4. The image reading device according to claim 3, wherein when the control unit causes the light source to discretely light up, the control unit causes the light source to be turned on at a point of time corresponding to the lighting start point in the case of reading the one line in the reference read time, be then turned off, start lighting before a point of time corresponding to the lighting end point in the case of reading the one line in the reference read time, and be then turned off at the point of time corresponding to the light end point.

5. The image reading device according to claim 1, wherein while the control unit causes the transport unit to accelerate the read rate to the reference read rate, the control unit causes the light source to light up once over the fixed lighting time during reading of each line so that a midpoint of the fixed lighting time gets behind a midpoint of the read time per line during the acceleration.

6. The image reading device according to claim 1, wherein while the control unit causes the transport unit to decelerate the read rate from the reference read rate, the control unit causes the light source to light up once over the fixed lighting time during reading of each line so that a midpoint of the fixed lighting time gets ahead of a midpoint of the read time per line during the deceleration.

7. The image reading device according to claim 5, wherein while the control unit causes the transport unit to accelerate the read rate to the reference read rate, the control unit causes the light source to be turned on at a point of time the fixed lighting time before the end of the read time per line during the acceleration and then turned off at the end of the read time per line.

8. The image reading device according to claim 6, wherein while the control unit causes the transport unit to decelerate the read rate from the reference read rate, the control unit causes the light source to light up over the fixed lighting time from the start of the read time per line during the deceleration and be then turned off.

9. An image forming apparatus comprising:
- a light source configured to irradiate a target to be read with light;
- an image sensor that includes a plurality of photoelectric conversion elements and is configured to read, based on reflected light from the target to be read, the target to be read for each line having a predetermined width in a sub scanning direction;
- a transport unit configured to move the light source or the target to be read in the sub scanning direction;
- a control unit that, during the reading of the target to be read by the image sensor, causes the light source to light up at a predetermined amount of light for a predetermined fixed lighting time and causes the transport unit to move to change a read time per line and a read rate of the image sensor; and
- an image forming unit configured to form an image using read data read by the image sensor,
- wherein while, during the reading of the target to be read by the image sensor, the control unit causes the transport unit to accelerate the read rate to a reference read rate which is the read rate at which the read time per line is a predetermined reference read time or to decelerate the read rate from the reference read rate, the control unit causes the light source to light up, within the read time, with timing brought close to a read section from a lighting start point to a lighting end point in the case of reading the one line in the reference read time.

* * * * *